United States Patent
Mehmood et al.

(10) Patent No.: US 8,311,218 B2
(45) Date of Patent: Nov. 13, 2012

(54) ROUNDING FOR SECURITY

(75) Inventors: Hakim N. Mehmood, Broomfield, CO (US); Mark L. Hendrickson, Lafayette, CO (US); Cullen F. Jennings, Santa Cruz, CA (US); Jonathan D. Rosenberg, Freehold, NJ (US)

(73) Assignee: Cisco Technology, Inc., San Jose, CA (US)

( * ) Notice: Subject to any disclaimer, the term of this patent is extended or adjusted under 35 U.S.C. 154(b) by 440 days.

(21) Appl. No.: 12/608,597

(22) Filed: Oct. 29, 2009

(65) Prior Publication Data

US 2010/0329453 A1 Dec. 30, 2010

Related U.S. Application Data

(60) Provisional application No. 61/222,036, filed on Jun. 30, 2009.

(51) Int. Cl.
*H04L 9/00* (2006.01)
*H04L 9/32* (2006.01)
*G06F 1/04* (2006.01)

(52) U.S. Cl. ........... 380/44; 713/168; 713/171; 713/503

(58) Field of Classification Search .................. 380/200, 380/205–207, 221, 223, 226, 243–244, 247, 380/255–257, 259–262, 270, 273, 277–280; 713/150–153, 168–171, 183–184, 375, 400–401, 713/500–502, 600; 726/2–10, 16–21
See application file for complete search history.

(56) References Cited

U.S. PATENT DOCUMENTS

| | | | |
|---|---|---|---|
| 4,885,778 A * | 12/1989 | Weiss | 713/184 |
| 5,737,421 A * | 4/1998 | Audebert | 713/170 |
| 6,877,095 B1 * | 4/2005 | Allen | 713/182 |
| 6,904,526 B1 * | 6/2005 | Hongwei | 713/182 |
| 7,904,946 B1 * | 3/2011 | Chu et al. | 726/5 |
| 2003/0105964 A1 * | 6/2003 | Brainard et al. | 713/178 |
| 2004/0162787 A1 * | 8/2004 | Madison et al. | 705/64 |
| 2004/0172535 A1 * | 9/2004 | Jakobsson et al. | 713/168 |
| 2005/0216744 A1 * | 9/2005 | Skygebjer | 713/182 |
| 2006/0064590 A1 * | 3/2006 | Bleumer et al. | 713/171 |
| 2009/0022149 A1 | 1/2009 | Rosenberg et al. | 370/389 |
| 2009/0141900 A1 * | 6/2009 | Ye et al. | 380/270 |

* cited by examiner

*Primary Examiner* — Darren B Schwartz
(74) *Attorney, Agent, or Firm* — Brinks Hofer Gilson & Lione

(57) ABSTRACT

A system may generate from a first value, based on rounding information, a first security key that matches a second security key whenever the first value and a second value from which the second security key is generated differ by less than a non-zero predetermined amount. The second security key may be generated from the second value rounded to a multiple of a rounding interval that is nearest to the second value. The rounding information may include a rounding direction indication. The rounding direction indication may indicate the direction in which the second value is rounded to the multiple of the rounding interval nearest to the second value.

13 Claims, 13 Drawing Sheets

ROUNDING FOR SECURITY

This application claims priority under 35 U.S.C. §119(e) to U.S. Provisional Patent Application No. 61/222,036, "Rounding For Security in Distributed Systems" filed Jun. 30, 2009, the entire contents of which are hereby incorporated herein by reference.

TECHNICAL FIELD

This disclosure relates generally to security and, in particular, to security keys generated from rounded values.

BACKGROUND

A distributed system may include multiple autonomous devices on a network. A first value measured at one device may be compared with a second value measured at a second device to see if the two values are the same. For example, the current times generated by a respective clock in each respective one of the two devices may be compared to see if the current times from the two devices are the same. The clocks may have been synchronized, or the clocks may share a common time server. Nevertheless, the two times may differ due to clock skew, clock drift, and latencies in communications between the two devices. To compensate for the potential difference between the two times, the two times may be compared and, as long as the two times are within an acceptable range of each other, the two times may be considered the same time.

Passwords or other security keys may be generated from values measured and/or generated by different devices or by the same device at different times. For example, the values measured or generated may be the two time values read from the respective clock in each respective one of the two devices discussed above. The security keys generated from the two time values may be compared, for example, to determine whether both devices have knowledge of the time an event occurred. Although the values may be considered the same if the values are within an acceptable range of each other, the actual values may not always be included in the passwords or other security keys. For example, each one of the security keys may include a cryptographic hash generated from a respective one of the values, but not the actual values. Therefore, if the values differ from each other, the cryptographic hash included in each one of the security keys may not be the same even though the values from which the cryptographic hashes are generated are within the acceptable range of each other. Thus, even if the values used to generate security keys are within an acceptable range of each other, the security keys cannot be used to determine whether the values are within the acceptable range of each other. Generating security keys based on shared knowledge is then limited to data that is exactly the same, not to data that may be within an acceptable range.

BRIEF DESCRIPTION OF THE DRAWINGS

The components and the figures are not necessarily to scale, emphasis instead being placed upon illustrating example embodiments. Moreover, in the figures, like-referenced numerals designate corresponding parts throughout the different views.

DESCRIPTION OF EXAMPLE EMBODIMENTS

Overview

Figure 1:
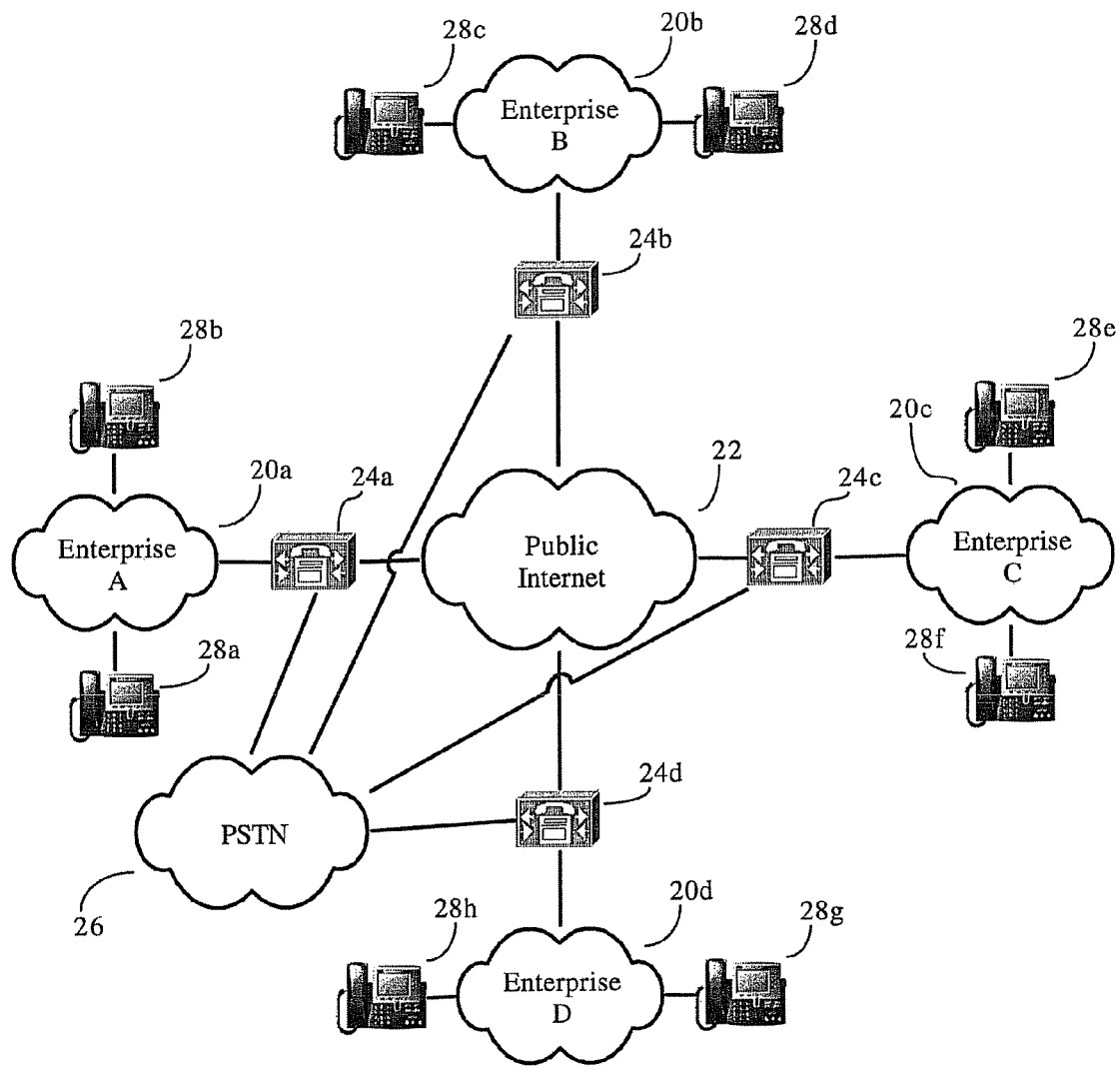
FIG. 1 illustrates example components in a Voice over Internet Protocol (VoIP) network and a Public Switched Telephone Network (PSTN) system.

By way of introduction, the example embodiments described below include an apparatus, logic encoded in a computer readable media, and a method to determine whether a first value and a second value are within a determined range of each other using security keys, to generate security keys based on shared information, which may not be exactly the same, or to determine whether security keys based on shared information, which may be rounded, match.

According to a first aspect, a system may generate, from a first value, a first security key that matches a second security key, where the second security key is generated from a second value, and where the absolute value of a difference between the first value and the second value is less than a non-zero predetermined amount. The system may generate a third security key from the first value rounded to a first rounded value. In response to a determination the third security key fails to match the second security key, the system may generate the first security key from the first value rounded to a second rounded value.

In a second aspect, logic encoded in the computer readable media may generate, from a first value, based on rounding information, a first security key that matches a second security key whenever the first value and a second value, from which the second security key is generated, differ by less than a non-zero predetermined amount. The second security key may be generated from the second value rounded to a multiple of a rounding interval nearest to the second value. The rounding information may include a rounding direction indication that indicates the direction in which the second value was rounded to the multiple of the rounding interval nearest to the second value.

In a third aspect, a method is provided. A first security key that matches a second security key may be generated from a first value based on rounding information. The second security key may have been generated from a second value rounded to a multiple of a rounding interval nearest to the second value. The rounding information includes a rounding direction indication indicative of the direction in which the second value was rounded to the multiple of the rounding interval nearest to the second value. Generating the first security key that matches the second security key may include rounding the first value to a rounded value based on the rounding direction indication, and generating the first security key from the rounded value.

Further aspects and advantages are discussed below in conjunction with the example embodiments.

Example Embodiments

A security key may be a password, a ticket, a shared secret, a cryptographic key, a cryptographic hash value, or any other object used for authentication. Any two security keys may be generated from values that may differ from each other by an acceptable predetermined amount such that the two security keys are bitwise the same even if the values are different. The issue of security keys not matching even when the values are within an acceptable range of each other may be addressed in part by rounding. Rounding includes replacing a value with a multiple of a predetermined amount. The predetermined amount may be referred to as a rounding interval. Examples of the rounding interval include 1.0, 0.25, 0.200, 5.0, or any other positive, non-zero value. Rounding a number y to the number q may include any known rounding algorithm. In a first example, rounding y to q may include rounding y to the nearest multiple of the rounding interval, where a tie-breaking rule determines which multiple of the rounding interval to select when y is exactly half-way between two adjacent multiples of the rounding interval. The tie-breaking rule may include rounding up whenever there is a tie. Alternatively, the tie-breaking rule may include determining whether to round up or down based on a random number. In a second example, rounding y to q may include rounding down, where q is the largest multiple of the rounding interval that does not exceed y. In a third example, rounding y to q may include rounding up, where q is the smallest multiple of the rounding interval that not less than y.

However, rounding alone introduces an issue. In particular, a first security key generated from the first rounded value may not match a second security key generated from the second rounded value even though the first and second values are within the acceptable range of each other.

Suppose the acceptable range for the base values is one half of a unit. The rounding interval may, correspondingly, be one unit. Thus, each one of the values may be rounded to the nearest integer before generating the security keys from the rounded values. A second value within a half of a unit of a first value may be rounded to the same number to which the first number is rounded. However, the first value and the second value may also be rounded to different numbers. For example, if the first value is 0.4 units and the second value is 0.6 units, the difference between the first value and the second value is 0.2 units, which is within the acceptable range of one half of the unit. Nevertheless, after rounding to the nearest integer, the first value may be rounded down to zero and the second value may be rounded up to one. Consequently, the security keys generated from the rounded values would not match.

In a different example, the values may be rounded down before generating the security key instead of rounding to the nearest multiple of the rounding interval. Where the first value is 0.4 units and the second value is 0.6 units, rounding the first and second values down, rounds both to the same number, zero. Consequently, the security keys would appropriately match. However, suppose the first value is 0.9 units and the second value is 1.1 units. The difference between the first value and the second value is 0.2 units, which is within the acceptable range of one half of a unit. Nevertheless, the first value may be rounded down to zero, and the second value may be rounded down to one. Consequently, the security keys may not match even though the first and second values are within the acceptable range of each other.

Implementations described below address the issue of the security keys not matching even though the first and second values are within the acceptable range of each other. As described below in more detail, in one example, the first value may be rounded in a determined direction and the rounded value is used to generate the first security key. For example, the first value may always be rounded down. The second security key may be generated multiple times, each time using a different value derived from the second value. For example, in a first time, the second security key may be generated by rounding the second value (e.g., 1.1) down to the largest multiple (e.g., 1) of the rounding interval (e.g., 1) that is less than the second value. In a second time, the second security key may be generated by rounding the second value down to the second largest multiple (e.g., 0) of the rounding interval that is less than the second value. Each one of the second security keys that is generated may be validated against the first security key to see whether the second security key matches the first security key.

As described in more detail below, in a second example, the rounding interval may equal n*delta, where $n \geq 4$ and delta equals the acceptable range of the difference between the first value and the second value. The first security key may be generated from the first rounded value, which may be the first value rounded to the nearest multiple of the rounding interval. The direction, up or down, to which the first value was rounded, may determine the direction that the second value is to be rounded. Let D equal the rounding interval, and FLOOR equal the second value rounded down to the largest multiple of D that is less than the second value. If the second value minus FLOOR is between, for example, ¼ D and ¾ D, then the second rounded value may be equal to the second value rounded in the same direction that the first value was rounded. Otherwise, the second rounded value may be the second value rounded to the nearest multiple of D. In the second example, the second rounded value equals the first rounded value as long as the absolute value of the difference between the first value and the second value is less than delta. The second security key may be generated from the second rounded value. Thus, the first security key may match the second security key if the difference between the first value and the second value is less than delta.

The following section fully describes a Public Switched Telephone Network (PSTN) validation mechanism in which security keys may be generated from values that may differ by an acceptable amount. The use of rounding as described above in the PSTN validation mechanism is then described.

PSTN Validation

The exchange and security of Voice over Internet Protocol (VoIP) calls between call agents over public packet-based communications networks may be facilitated in a PSTN system. A call agent may use the PSTN system to verify ownership of a telephone number by another call agent. As described in further detail below, in one implementation, a call agent claiming ownership to one or more telephone numbers may modify a registry of VoIP call routing information with address blocks containing telephone numbers and/or prefixes in association with a network address of a call agent. The registry may be accessible to multiple call agents across a network. The registry may be a maintained in a central repository or in a distributed system, such as a peer-to-peer (P2P) network, where each call agent is a peer operative to exchange VoIP call routing information with other peers.

The registry may include a hash-based access mechanism to protect unfettered access to the VoIP call routing information. The hash-based access mechanism may be based on a cryptographic hash function. The cryptographic hash function may be a deterministic procedure that takes an arbitrary block of data and returns a fixed-size bit string, the (cryptographic) hash value, such that an accidental or intentional change to the data will change the hash value. One property of the cryptographic hash function is that determining what the arbitrary block of data is from the hash value is computationally expensive or infeasible. The hash-based access mechanism to protect unfettered access to the VoIP call routing information may leverage this property of the cryptographic hash function.

For example, instead of each entry of the registry including a telephone number or prefix (or block of telephone numbers) stored unencrypted, the entry may include a hashed value of each telephone number or prefix. To create an entry in the registry, a call agent may hash each of its claimed telephone numbers and prefixes and place each into the registry. Similarly, an originating (calling) call agent, responsive to a call initiation message identifying a destination telephone number, may determine the IP address of a destination call agent by hashing the destination telephone number and looking the destination telephone number up in the registry. In one implementation, the originating call agent searches the registry for a matching entry, where a matching entry would contain an IP address corresponding to the destination call agent. As described in more detail below, the originating call agent may have the destination telephone number, while the hash in the registry may be of a prefix that covers the destination telephone number. Accordingly, in one implementation, if there is not a matching entry for the hashed destination telephone number, the originating call agent may strip the last digit of the number, hash the stripped number, and perform another search. The originating call agent may repeat this process until a match is found or until the number of remaining digits is reached to a predefined threshold number.

However, the usage of the registry alone may not be sufficient for secure operation of the system. One challenge to solve is to be confident that the entries in the registry are correct. In particular, a validation should be performed to verify that the call agent that has written an entry or series of entries into the registry is truly the "owner" of those numbers. Here, "ownership" implies the property that, had the call actually been routed over the PSTN, the call would arrive at that same agent or an agent within the same enterprise. As described in further detail below, in one implementation, an originating call agent may validate ownership of a telephone number by making a PSTN call to the destination call agent claiming to own the telephone number. Both call agents may record attributes of the PSTN call. PSTN call attributes may include, for example, a start time, an end time if applicable, a call length, caller ID, and other attributes of the call. Either during or after the call, the originating call agent transmits a request, over IP, for PSTN call attributes to the destination call agent. If the destination call agent had not received the PSTN call, the destination call agent will not have access to these attributes. Therefore, if the destination call agent can provide these attributes to the originating call agent, the destination call agent can demonstrate ownership of the destination number. Depending on whether the destination call agent responds successfully, the originating call agent may apply an appropriate policy (e.g., store data associated with the verified call agent in the cache so that, for example, future calls can be connected immediately over VoIP, continue the PSTN call, etc.).

As described in further detail below, in one implementation, a destination call agent may verify the caller identification (ID) provided in a VoIP call signaling message sent by an originating call agent by validating the originating call agent against the cache or against the registry. In one implementation, the destination call agent may also verify the caller ID provided by the originating call agent by making a PSTN call to the number provided in the caller ID, where both call agents record the PSTN call attributes. Either during or after the call, the destination call agent may transmit, over IP, a request for PSTN call attributes to the originating call agent. Depending on whether the originating call agent successfully responds to the request, the originating call agent may apply an appropriate policy. For example, the originating call agent may display the caller ID or permit the call to proceed for a verified call agent.

As also described in further detail below, in one implementation, the validation of VoIP routes may be separated from the call agent. A validation server—instead of or in addition to the call agent—may validate ownership of a telephone number or otherwise communicate with the registry. The validation server and the call agent may communicate using a validation access protocol (VAP). Using VAP, the call agent may transmit the PSTN call attributes to the validation server. After validating VoIP routes, the validation server may transmit the validated VoIP routes using VAP to the call agent for storage in a cache. When determining whether to initiate a call to a destination telephone number over a VoIP network or over the PSTN, the call agent may search the cache for a corresponding validated route that matches the destination telephone number. If the call agent finds a corresponding validated route, then the call agent may initiate the call over the VoIP network. If the call agent fails to find the corresponding validated route, the call agent may initiate a call over the PSTN.

FIG. 1 illustrates an example network environment including a packet-switched communications network, supporting a Voice over Internet Protocol (VoIP) network, and a Public Switched Telephone Network (PSTN) system. In one embodiment, the system includes enterprise networks 20a, 20b, 20c, and 20d that are operably coupled to a public Internet 22. The enterprise networks 20a, 20b, 20c, and 20d include respective call agents 24a, 24b, 24c, and 24d that are also operably coupled to a PSTN network 26. Each of enterprise networks 20a, 20b, 20c, and 20d are also operably coupled to one or more clients 28a-28h over the respective enterprise networks.

A call agent 24, may be any component configured to receive call control protocol messages. Alternatively or in addition, the call agent 24 may be any component configured to transmit call control protocol messages. A VoIP call agent, may be any call agent 24 configured to receive VoIP call control protocol messages. Alternatively or in addition, the VoIP call agent may be any call agent 24 configured to transmit VoIP call control protocol messages. Examples of a VoIP call control protocol include Session Initiation Protocol (SIP), H.323 Protocol, or any other suitable signaling protocols. In one implementation, a call agent 24 may be an IP-PBX hosting call manager application, such as Cisco Call Manager (CCM), or any node hosting VoIP call manager functions. In another implementation, the call agent 24 may be an IP to IP gateway, such as a Session Border Controller (SBC) or Back-to-Back User Agent (B2BUA) connected to an existing TDM PBX, IP PBX, or other voice or voice over IP equipment. In another implementation, call agent 24 may be a firewall or border router at the edge or near the edge of the IP network 20. In yet another implementation, the call agent 24 may be a softswitch. In one implementation, the call agents 24 may perform the processes described below, including functionalities directed to accessing registries of VoIP call routing information, making and receiving PSTN and VoIP calls and verifying other call agents. In particular implementations, call agents 24 may possibly have media gateway functionalities. In one implementation, a client 28 may be a phone operably connected to a network or directly to a call agent 24. Alternatively or in addition, the client 28 may be a VoIP client.

A call agent 24, when implemented on an IP-PBX, may switch calls between VoIP clients 28 on local lines while allowing all VoIP clients 28 to share a certain number of external PSTN network phone lines. The call agent 24 may also switch calls between a VoIP user and a traditional telephone user, or between two traditional telephone users in the same way that a conventional PBX does.

In particular implementations, the call agents 24 are operative to connect through the public internet 22 to form a P2P network for the purpose of maintaining a distributed registry of VoIP call routing information. In another implementation, call agents 24 all access a centralized or hierarchically structured common store, such as a database Domain Name System (DNS) servers for the purpose of storing and accessing the registry of VoIP call routing information. In one implementation, each call agent 24 is operable to maintain and access a cache, where the cache may be a local cache that resides in the call agent 24 or may be external to but accessible by call agents 24 of the P2P network. As discussed below, the local cache contains validated VoIP call routing information. Each call agent 24 is also operable to access a registry of VoIP call routing information. A given call agent 24 may access its cache or the registry to store or to look up VoIP call routing information of other call agents to make VoIP calls, as well as to verify other call agents.

A PSTN 26 is a circuit-switched network, comprising all or a subset of the world's public circuit-switched telephone networks. The PSTN may include partial fixed-line analog telephone systems, and partial digital telephone systems, as well as mobile telephone systems. An advantage of utilizing the PSTN 26 is that the PSTN 26 may operatively connect many enterprises in the world that have PSTN connectivity and possibly caller ID and connected party ID.

Figure 2:
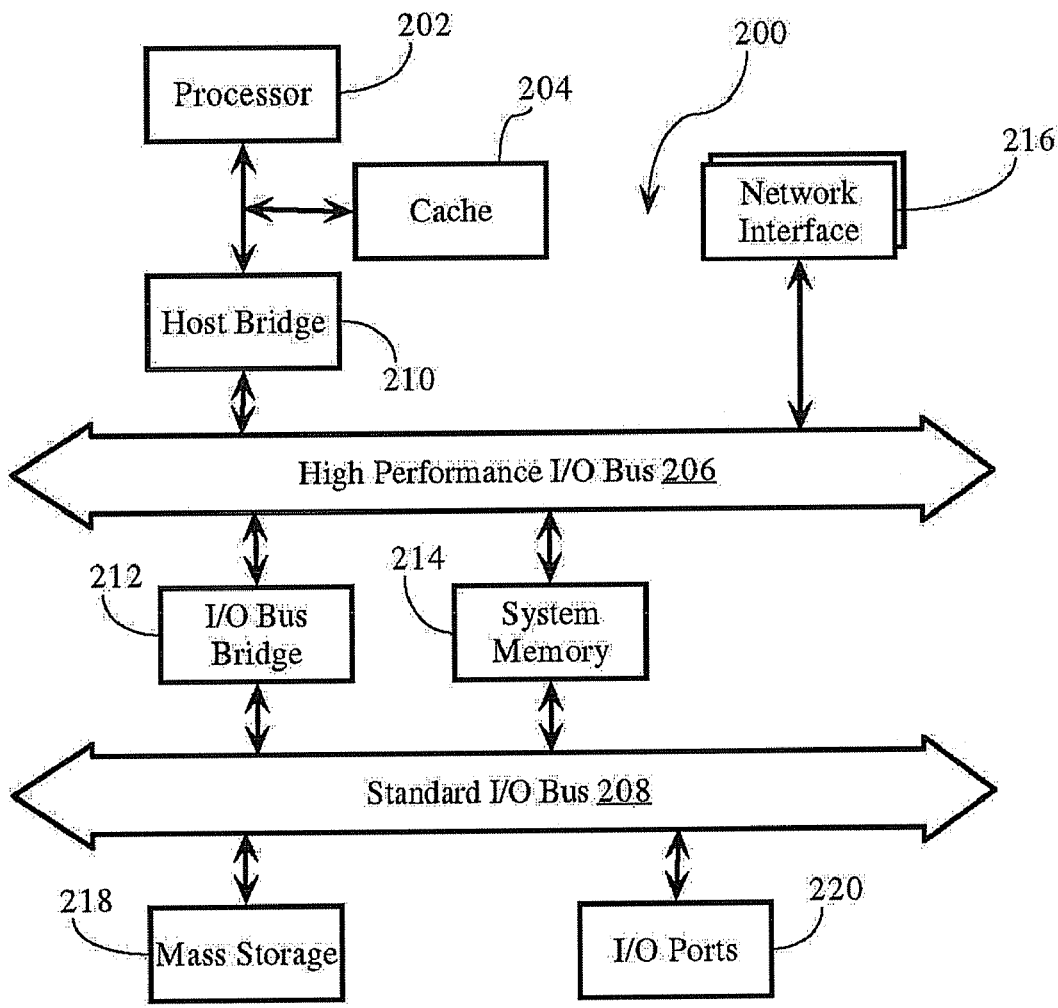
FIG. 2 illustrates for didactic purposes a hardware system, which may be used to implement an Internet Protocol Private Branch Exchange (IP-PBX) or other host of call agent or call manager functionality.

FIG. 2 illustrates for didactic purposes a hardware system 200, which may be used to implement a call agent host, such as an Internet Protocol Private Branch Exchange (IP-PBX). In one implementation, hardware system 200 comprises a processor 202, a cache memory 204, and one or more software applications and drivers directed the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and one or more network/communication interfaces 216 couple to bus 206. Hardware system 200 may further include video memory (not shown) and a display device coupled to the video memory. Mass storage 218 and I/O ports 220 couple to bus 208. Hardware system 200 may optionally include a keyboard and pointing device (not shown) coupled to bus 208. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the system controller, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures, and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain implementations may not require nor include all of the above components. For example, the peripheral devices shown coupled to standard I/O bus 208 may couple to high performance I/O bus 206. In addition, in some implementations a single bus may exist with the components of hardware system 200 being coupled to the single bus. Furthermore, hardware system 200 may include additional components, such as additional processors, storage devices, or memories.

As discussed above, in one embodiment, the operations of the gateway or call manager described herein are implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment, the operating system is the Windows® 95/98/NT/XP operating system, available from Microsoft Corporation of Redmond, Wash. However, other embodiments may be used with other suitable operating systems, such as the Apple Macintosh Operating System, available from Apple Computer Inc. of Cupertino, Calif., UNIX operating systems, and LINUX operating systems.

In one embodiment, VoIP call routing information is maintained in a registry accessible to one or more call agents 24. In one implementation, the registry may be discoverable and publicly accessible. In one embodiment, the VoIP call routing information may include a set of entries, each including a telephone number or a prefix that represents a range of telephone numbers (or a set of telephone numbers or prefixes). For example, a given enterprise may own the telephone number +1-408-876-5432 and an address block of telephone numbers +1-973-952-5000 through +1-973-952-5999. As such, the call agent 24 of the enterprise may create two entries and would register, for each, a mapping that associates its identity with the number or prefix. In one implementation, the key for the mapping is the number or prefix of the number, including the digits only. In the example above, one key would be 14088765432, and the other would be 19739525. As such, in one implementation, each call agent may register blocks of telephone numbers that each call agent owns by treating the prefix as a number and entering the prefix in the registry. The identity information may include a network address (e.g., IP address, port number, hostname, etc.) or any other type of information that identifies a call agent.

In one embodiment, participation in the P2P network may require the call agent to have a predefined minimum number (e.g., a few dozen) of TCP connections to other nodes in the network. Those connections may be established dynamically, with the peers learned through the P2P protocols. In one implementation, registration into the P2P network may involve running an algorithm to select a peer to which a write operation should take place. That peer, in turn, passes the write onto another peer, and so on. This results in the data being stored and distributed across the call agents participating in the P2P network.

As discussed above, the registry of VoIP call routing information may include a hash-based mechanism protecting against unfettered access to the registry. That is, the telephone numbers or prefixes in the registry entries are hashed values. To store an entry in the registry, a call agent may first hash its associated phone number or prefix before storing the hashed value in the registry in association with its identity. The call agent may hash the telephone number or prefix using any suitable hash algorithm, such as MD5 and SHA1. Generally, a strong hash function should be used to ensure that the hashed value is unique to a given telephone number or prefix. By hashing the prefix or phone number, a given call agent may advertise number blocks in a secure manner. For example, using hashed telephone numbers or prefixes prevents telemarketers, spammers and spitters (VoIP spammers) from simply collecting telephone numbers from the registry. A user would need to know the correct telephone number first before attempting a successful search of the registry for VoIP call routing information. Otherwise, it would be computationally expensive (because of the computing resources required to compute the hash) to attempt to learn a significant amount of the VoIP call routing information maintained in the registry by repeatedly selecting a telephone number or prefix, computing a hash value and looking the hash value up against the registry.

Topologically, the registry of VoIP call routing information may be maintained in a variety of ways. In one implementation, the registry may be maintained using a P2P network. The P2P network may be made up of all or some of the call agents in the system, or the registry can be maintained in a different P2P network, accessed by all of the call agents in the system. When a P2P network is utilized, each node in the P2P network (which may be the call agents), will end up maintaining a subset of the information in the registry, depending on the P2P protocols that are in use. Any suitable P2P protocol or technique may be used, such as Chord, CAN, Bamboo, and Kademlia.

In some embodiments that utilize a centralized registry system, a central server may maintain the registry, where the registry may be a central repository accessible by one or more call agents. In one embodiment, a given call agent may send a phone number or prefix to a central data store, and the central data store will store the phone number or prefix. Other call agents may query the central data store, and retrieve the mapping from the phone number to the identity of the call agent. In another embodiment, the central registry may hash the phone number or prefix and store the hashed phone number or prefix in the registry.

In some embodiments that utilize a hierarchical registry system, such as the domain name system (DNS), a given call agent may transform the phone number or prefix into a hierarchical identifier, for example, by utilizing a telephone number mapping protocol, such as the Electronic Numbering (ENUM) protocol defined by the IETF in RFC 2916. The call agent may then use this identifier to write the VoIP call routing information into the hierarchical system at the appropriate location. The servers in the hierarchy may be the same as the call agents, or different. If the DNS is used as the hierarchical system, this may be a public DNS or a private DNS.

In some embodiments, a given call agent may receive a telephone number in a call initiation message from an originating client or an originating call agent, and then use the telephone number to lookup VoIP call routing information in the registry. In one embodiment, the call agent may search the registry for each of the N−1 prefixes of the N-digit destination number. Searches may be based on exact matches, as opposed to hierarchical matches. In other words, one address block should be found, and if more than one address block is found, the most specific one is used. Assuming there is a matching entry in the registry, the identity of the terminating call agent for that number or number block (which includes the IP address and port number of the destination call agent) that was found may be cached to avoid queries in the future.

Figure 3:
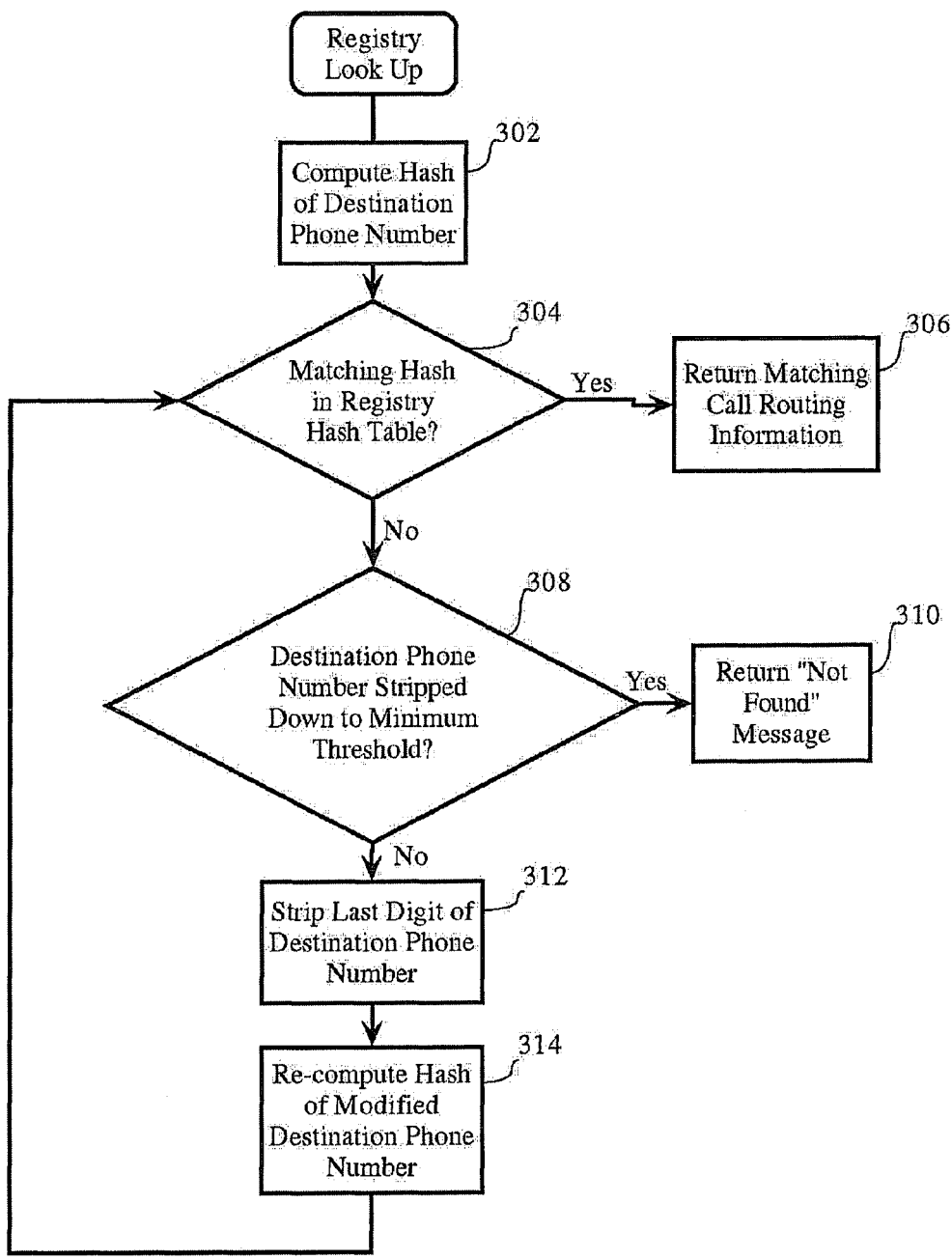
FIG. 3 illustrates an example process flow implemented at an originating call agent and associated with looking up an address block in a registry of VoIP call routing information.

In particular embodiments, where the registry stores hashed telephone numbers or prefixes, a look up process implemented on a call agent may perform the following operations in order to look up VoIP call routing information. FIG. 3 illustrates an example process flow implemented at a call agent directed to looking up VoIP call routing information in the registry. Responsive to some event (such as receiving a call initiation message identifying a telephone number), the look up process computes a hash of an identified telephone phone number (302). The look up process then accesses the registry and determines if there is a matching entry, or specifically, if the hashed telephone number matches (based on an exact string match) any hashed numbers in the registry (304). If so, VoIP call routing information corresponding to the matching entry is returned (306) and possibly used in some other process implemented by the call agent. For example, in one embodiment, the IP address of the destination call agent corresponding to the telephone number may be used to route a VoIP call.

If there is no matching entry, the look up process determines if the telephone number is stripped to a minimum threshold number of digits (308). In one embodiment, the minimum threshold may be a predefined number of digits. For example, the minimum threshold number may be 1 digit (e.g., the smallest country code possible). If the telephone number is stripped to a minimum threshold number of digits, the look up process returns a "not found" message (310). The call agent 24 may respond to this message in a variety of manners depending on the context. For example, in one implementation, an originating call agent may attempt to make a PSTN call or may deny the call, optionally notifying the originating client of the call denial and optionally providing a reason for denying the call.

If the destination phone number is not stripped to a minimum threshold number, the look up process strips the last digit of the telephone number (312). The originating call agent then re-computes the hash of the modified telephone number (314) and determines if the re-computed hashed telephone number matches any hashed telephone numbers in the registry (304). The call agent may continue this process until a matching entry is found or until the destination phone number has been stripped down to the minimum threshold number.

This process provides security to the system, because without a legitimate phone number, the process would be computationally expensive to acquire phone numbers. In one embodiment, policies may be applied to detect suspicious nodes that transmit queries that result in greater than a threshold number of failures over a sliding window of time.

As described in more detail below, a given call agent may use the facilities of a PSTN to validate VoIP call routing information in the registry. For example, a call agent may verify that another call agent can legitimately claim ownership of a telephone number the call agent wrote into the registry. Here, "ownership" may imply the property that, had the call been made over the PSTN, the call would have been routed to the call agent which wrote the entry into the registry, or if not that call agent, another call agent under the same administrative control. For example, a call agent, responsive to an identified telephone number, may make a PSTN call to that telephone number over PSTN 26. Generally, if the call agent claiming ownership of the destination telephone number is authentic, the call agent will receive the PSTN call over PSTN 26 and will thus have an opportunity to record one or more attributes of the PSTN call, such as start time, end time, calling party identifier, and the like. The PSTN call attribute information can be used as a shared secret to allow the first call agent to validate the other call agent. As described in more detail below, verification of a call agent may occur during or after a PSTN call.

In the implementation described below, a given call agent may store verified VoIP call routing information in a local cache. The call agent, responsive to a call initiation message identifying a destination telephone number, may selectively place a PSTN or VoIP call to a given destination telephone number depending on the presence, or absence, of validated VoIP call routing information in the cache that corresponds to the destination telephone number. Matching validated routing information in the cache generally means that the terminating call agent has been verified. The originating call agent may then place a VoIP call by transmitting a call initiation message to the terminating call agent. If no validated match is found in the cache, but the number is in the cache as a consequence of a previous query to the registry, the call agent may place a PSTN call and validate the call agent. If no match is found in the cache at all, the call agent may query the registry for the number as described above, in addition to placing a PSTN call.

Figure 4:
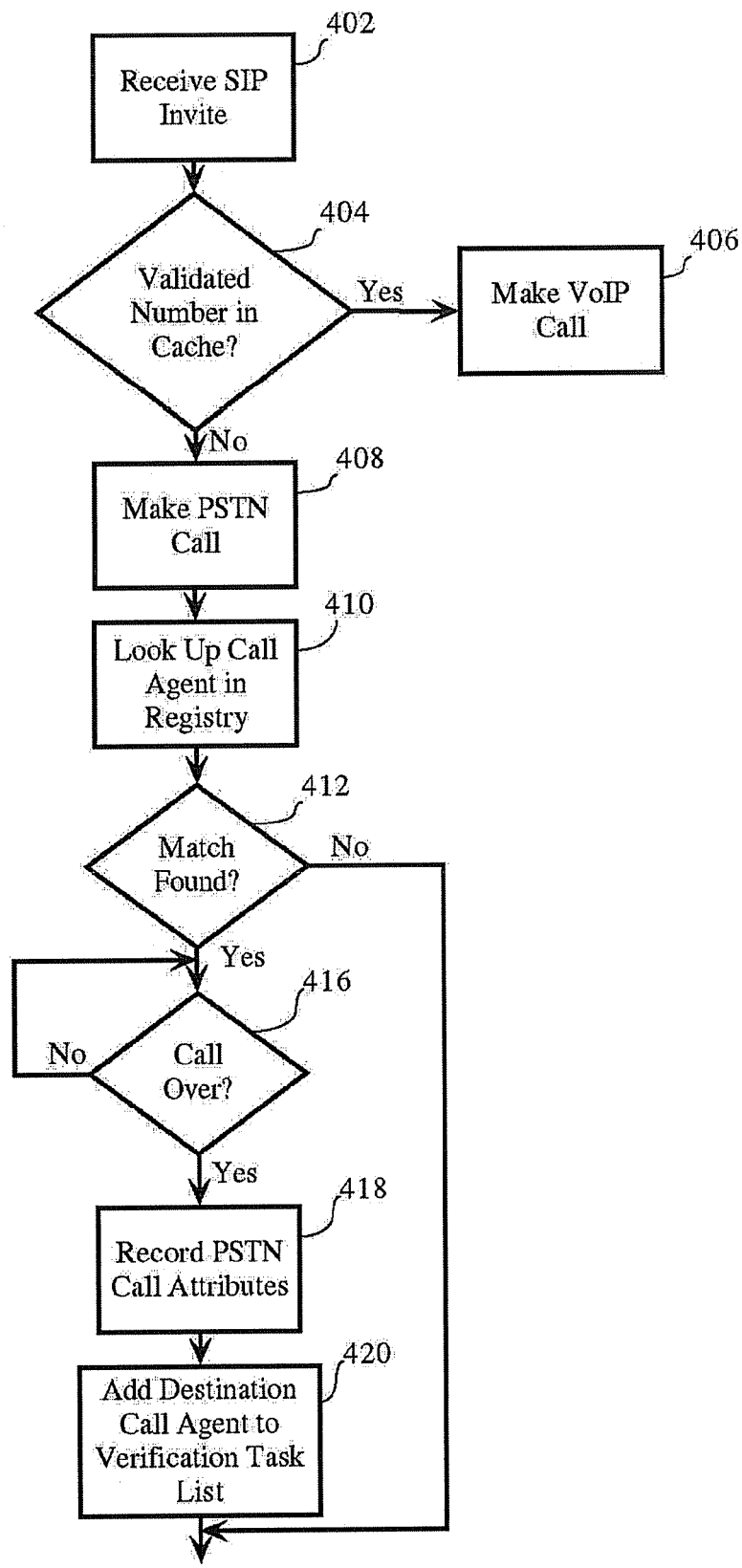
FIG. 4 illustrates an example process flow implemented at an originating call agent to determine whether to make a PSTN or VoIP call in response to a call initiation message.

FIG. 4 illustrates an example process flow implemented at an originating call agent directed to selectively placing a PSTN or VoIP call responsive to a call initiation message from a calling node. As FIG. 4 shows, the process begins when the originating call agent (e.g., call agent 24*a*) receives a call initiation message, such as a SIP invite, from an originating (calling) node (e.g., client 28*a*) (402). In one embodiment, the call initiation message includes a destination telephone number.

The originating call agent accesses its cache to determine if there is a matching validated cache entry, whereby the cached address block is associated with the destination number, and the destination number has been validated previously (404). If there is a matching validated entry in the cache, the originating call agent makes a VoIP call, transmitting signaling messages to the terminating call agent associated with the matching address block in the local cache (406). This signaling message can be sent directly to the destination call agent, or can be sent through intermediate servers or providers.

If there is no matching validated address block in the cache, the originating call agent makes a PSTN call to the destination telephone number (408). As FIG. 4 shows, the originating call agent may also look up, using the telephone number, the terminating call agent in the registry (408), if the destination number is not in the cache at all. More specifically, in one embodiment, the originating call agent may use the destination phone number to look up VoIP call routing information of the destination call agent in the registry (see Section C, above). If a matching entry is found (412), the originating call agent may record one or more attributes of the PSTN call to be used in a subsequent verification process. In the implementation shown, the originating call agent, after the PSTN call ends (416), records one or more PSTN call attributes in a data store (e.g. a called-out database) (418), and adds the terminating call agent to a verification task list (420). In one implementation, the data store may be a temporary data store that stores the information for a period of time, or the data store may be a database with persistent storage. In another implementation, the PSTN call attributes can be recorded for every call, and then the registry can be queried as part of the procedures followed when executing the verification task list.

A variety of PSTN call attributes can be stored. In one implementation, the PSTN call attributes may include a PSTN call start time, a PSTN call stop time, call length (e.g., how long the call lasted), a caller ID of the calling client, and any other information that the originating VoIP network may be used to verify that the destination received the PSTN call. Other PSTN call attributes may include signatures of the voice data as computed by the originating and terminating gateways. For example, the call agents may compute the amount and start times of silent periods during a call, or a spectral signature of the voice data during the call. Other PSTN call attributes may include a sequence of DTMF tones that the originating gateway may transmit during some point in the call (e.g., just prior to call termination).

One advantage of the implementations describe herein is that they may be used with telephone numbers. Another advantage is that implementations described herein are undetectable by service providers. Because enterprises may still make PSTN calls, implementations described herein may reduce the volume of such PSTN calls.

Furthermore, other implementations are possible. For example, even if matching VoIP call routing information is found in the cache, the originating call agent (according to some randomized or other process) may nevertheless select the entry for re-validation, causing the call agent to make a PSTN call and to add the call agent to a verification list. Still further, call agent may apply an aging algorithm to its cache to flush old entries.

Figure 5:
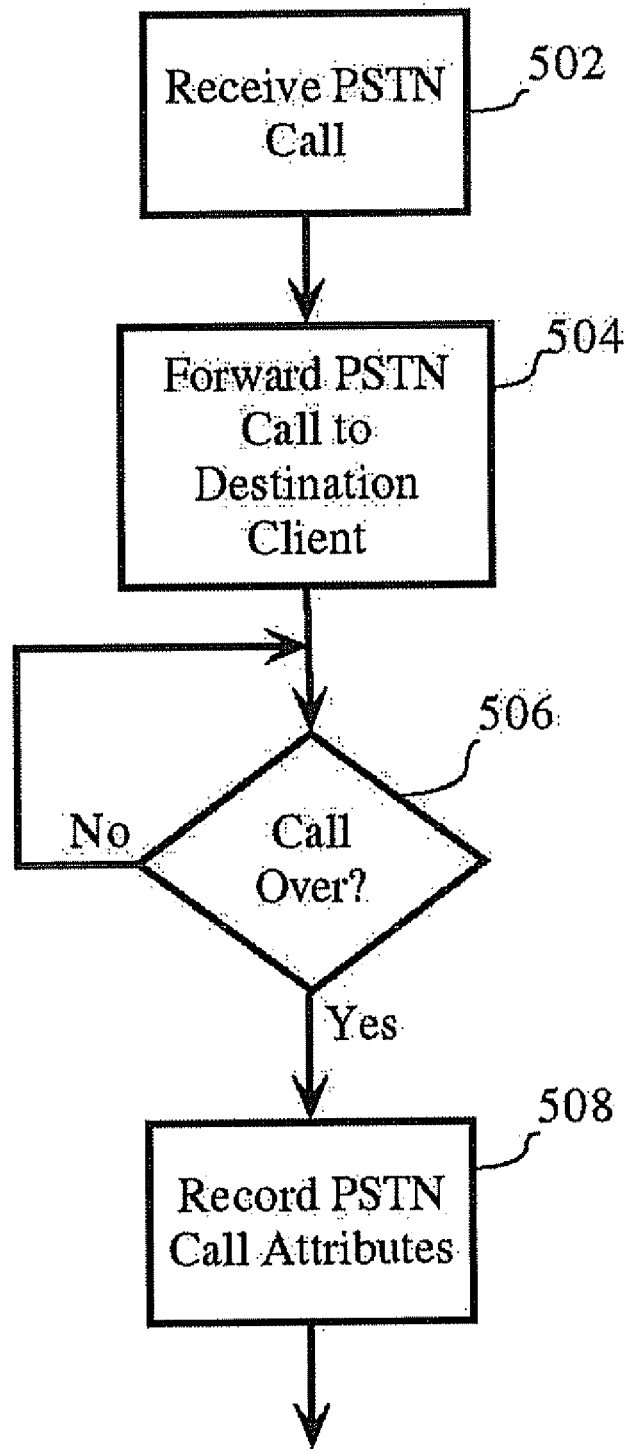
FIG. 5 illustrates an example process flow implemented at a destination call agent responsive to receiving a PSTN call.

FIG. 5 illustrates an example process flow implemented at a destination or terminating call agent directed to recording one or more attributes associated with a received PSTN call. To allow for verification, a terminating gateway may record one or more attributes of a PSTN call in order to successfully answer queries from the originating call agent. As FIG. 5 illustrates, the destination call agent receives a PSTN call (502) and then forwards the PSTN call to the destination client (504). After the call ends (506), the destination call agent records the PSTN call attributes in a data store (e.g. a called-in database) (508). In one implementation, the data store may be a temporary data store that stores the information for a period of time. The foregoing section identifies example PSTN call attributes that the terminating call agent may record.

If the originating call agent performs the verification after the PSTN call, the originating call agent may perform the verification at various times depending on the specific implementation. For example, the originating call agent may perform verification immediately after the PSTN call. In other implementations, the originating call agent may verify multiple destination call agents in a batch process run at off-peak periods. In one implementation, the originating call agent may verify the destination call agent at a random time after the call is completed. The originating call agent may perform one or more verification operations upon a triggering event such as when receiving a new call initiation message.

As described in more detail below, the verification may be a knowledge-based verification, where the originating call agent queries the destination call agent for PSTN call attributes corresponding to one or more prior PSTN calls. The PSTN call attributes may be conceptualized as "shared secrets" that only those two call agents would know.

Figure 6:
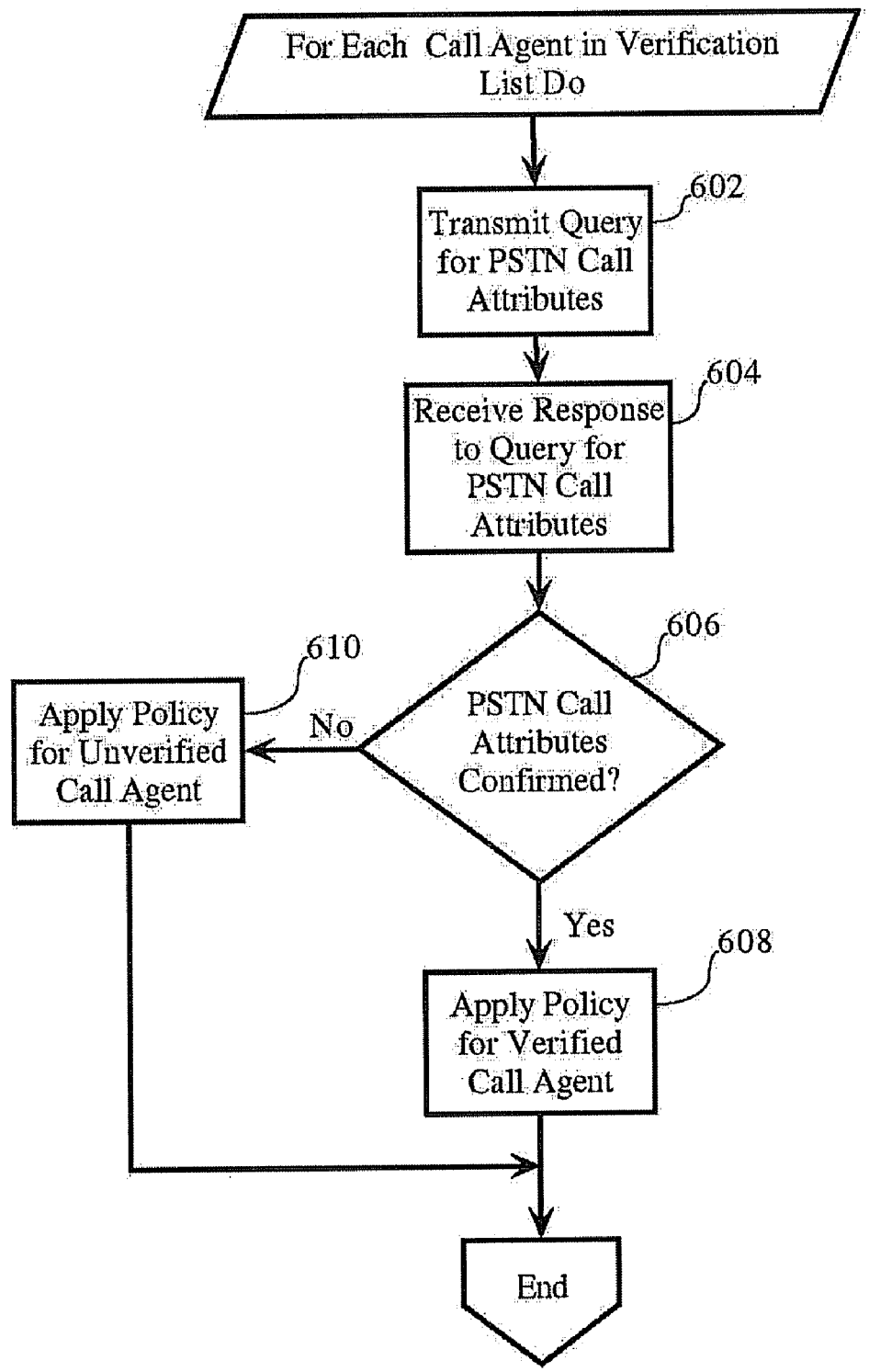
FIG. 6 illustrates an example process flow implemented at an originating call agent and associated with verifying a destination call agent.

FIG. 6 illustrates an example process flow implemented at the originating call agent and associated with verifying the destination call agent. As FIG. 6 shows, for each destination call agent in the verification list, the originating call agent transmits a query for PSTN call attributes to the destination call agent (602). The query may be transmitted over a packet-based communications network using the IP address and port of the destination call agent learned from the registry.

The call agents may communicate according to a variety of different protocols. For example, in one implementation, the "called-in" database maintained by a destination call agent may be accessible to a verifying call agent by using a directory access. The originating call agent may send a query using the destination phone number as a key, and the terminating agent would return the recorded PSTN attributes for calls with that destination phone number. Any number of protocols can be used for this purpose, including standard database and directory protocols, such as LDAP and SQL, or HTTP queries, SOAP queries, or any other suitable technology for querying for a piece of data and getting a response.

In an alternative implementation, an actual authentication protocol can be used to improve security. In this implementation, the PSTN call attributes are mapped to a username and password, and then a traditional authentication or login protocol can be used to verify the data. For example, the user name may be the destination number and start time of the PSTN call, and the password may be the stop time of the PSTN call. As another example, the username can be the destination number and a random time in the middle of the call, and the password can be the start and stop times of the call. As another example, the username can be the destination number and caller ID, and the password can be the start time and stop time of the call. In one implementation, the PSTN call attributes may include information associated with the content of the PSTN call. For example, during a given PSTN call, both the originating and destination call agents may execute a silence detection algorithm to detect silence and talking. The VoIP may then generate a PSTN call signature or fingerprint based on the detected silence and talking patterns. This fingerprint or signature can be used as part of the username and/or password. For example, the username could be the destination number and start time of the call, and the password could be the fingerprint. Or, the username could be the destination number and signature over the first half of the call, and the password is the signature over the second half.

In one implementation, the PSTN call attributes may include a call signature or fingerprint. In one implementation, the originating call agent may execute frequency spectrum analysis or speech recognition algorithms to generate the call signature or fingerprint. In one implementation, the originating call agent may, prior to the end of the PSTN call, send a random string using dual-tone multi-frequency (DTMF) values that both call agents record. The call signature or fingerprint may then include the DTMF bits. In one implementation, the query may provide the destination call agent minimal information such as the call start time. Based on the limited information, the destination call agent may ascertain the appropriate information to provide.

When the originating call agent receives a response to the query for PSTN call attributes (604), the originating call agent determines if the PSTN call attributes are confirmed (606). In one implementation, the PSTN call attributes are confirmed if the PSTN call attributes in the response from the destination call agent match the PSTN call attributes that the originating call agent stored in the "called out" database. In one implementation, when an authentication or log-in protocol is utilized, the PSTN call attributes are confirmed if the log-in or authentication protocol succeeds. In one implementation, the authentication protocol may function without transmitting the PSTN call attributes from either call agent during authentication. For example, the authentication protocol may be based on an Encrypted Key Exchange (EKE) protocol that provides zero-knowledge password proof. The EKE protocol may be any now known or later discovered password-authenticated key agreement algorithms. A password-authenticated key agreement algorithm may include an interactive algorithm for two or more parties to establish cryptographic keys based on one or more party's knowledge of a password. Examples of the EKE protocol include a protocol based on Diffie-Hellman known as DH-EKE and the PAK family of algorithms described in IEEE (Institute of Electrical and Electronics Engineers) P1363.2. In one implementation, the validation may fail due to a given PSTN call being forwarded to an illegitimate call agent.

If the PSTN call attributes are confirmed, the originating call agent applies an appropriate policy for verified destination call agents (608). For example, the originating call agent mark the entry in the cache for this number as being validated, resulting in future VoIP calls subsequently being made to that call agent, as discussed above. That is, if the VoIP routing information is validated for the first time, the originating call agent will find a matching entry in the cache the next time, and will thus able to make a VoIP call to the now verified call agent. As such, no subsequent search to the registry would be necessary.

Furthermore, the verifying call agent may establish a connection to the verified call agent for routing of VoIP call initiation messages. In one implementation, once a Transmission Control Protocol (TCP)/Transport Layer Security (TLS) connection is established, the originating call agent may send an SIP invite directly to the destination call agent. In one implementation, a given call agent may maintain multiple TCP/TLS connections up to a predefined number (e.g., 1,000 connections), after which the call agent may terminate an inactive or the least active connection.

If the PSTN call attributes are not confirmed, the originating call agent applies an appropriate policy for unverified destination call agents (610). For example, the originating call agent may log the verification failure in the cache, generate an alert message, add the call agent to a black list and the like, etc.

Implementations of the verification process may be optimized in a variety of ways. In one implementation, even if a given phone number or prefix is stored/validated in the cache, the verification may be augmented to cause a revalidation. For example, in one implementation, the originating call agent may randomly select some calls to re-verify that the destination call agent still owns the particular phone number of phone number block. In one implementation, the originating call agent may re-verify a predefined percentage of the calls (e.g., 5%) or a random number of calls. In another implementation, the call agent may timeout the validation after a configured period of time, for example, one month, so that re-verification is performed once a month.

In another optimization, when a particular number in a block has been verified, other numbers in that same block can also be considered verified. For example, if number A and number B within a block have been verified, the call agent can consider all numbers between A and B within that block to also be verified. In one implementation, this automatic verification can happen only when numbers A and B are close to each other, for example within 1000 numbers.

In another implementation, the shared secret may be defined based on the last N PSTN calls, improving the security of the mechanism. In one embodiment, instead of basing the PSTN call attributes on the last N calls between any two telephone numbers in a given block, the PSTN call attributes may be based on the last N calls between specific telephone numbers. In one implementation, if the originating call agent may validate a predefined number or predefined percentage of telephone phone numbers of a given address block (e.g., 2 out of 50 telephone numbers, or 4%), the originating call agent may accept the remaining telephone numbers of the address block for future calls.

In one implementation, if the destination call agent is verified before the PSTN call ends, the originating call agent may optionally permit the PSTN call to continue even with the successful verification. As such, the VoIP call may be used for enhanced features on top of the voice portion of the calls (e.g., the PSTN call). For example, the originating call agent may use the PSTN call for voice and use the VoIP call for enhanced features such as video, sound, presence, Instant Messaging (IM), and/or data applications.

Accordingly, implementations provide advantages such as preventing call agents from claiming ownership to a telephone number that they actually do not own. Also, implementations do not require any special PSTN configurations.

Figure 7A:
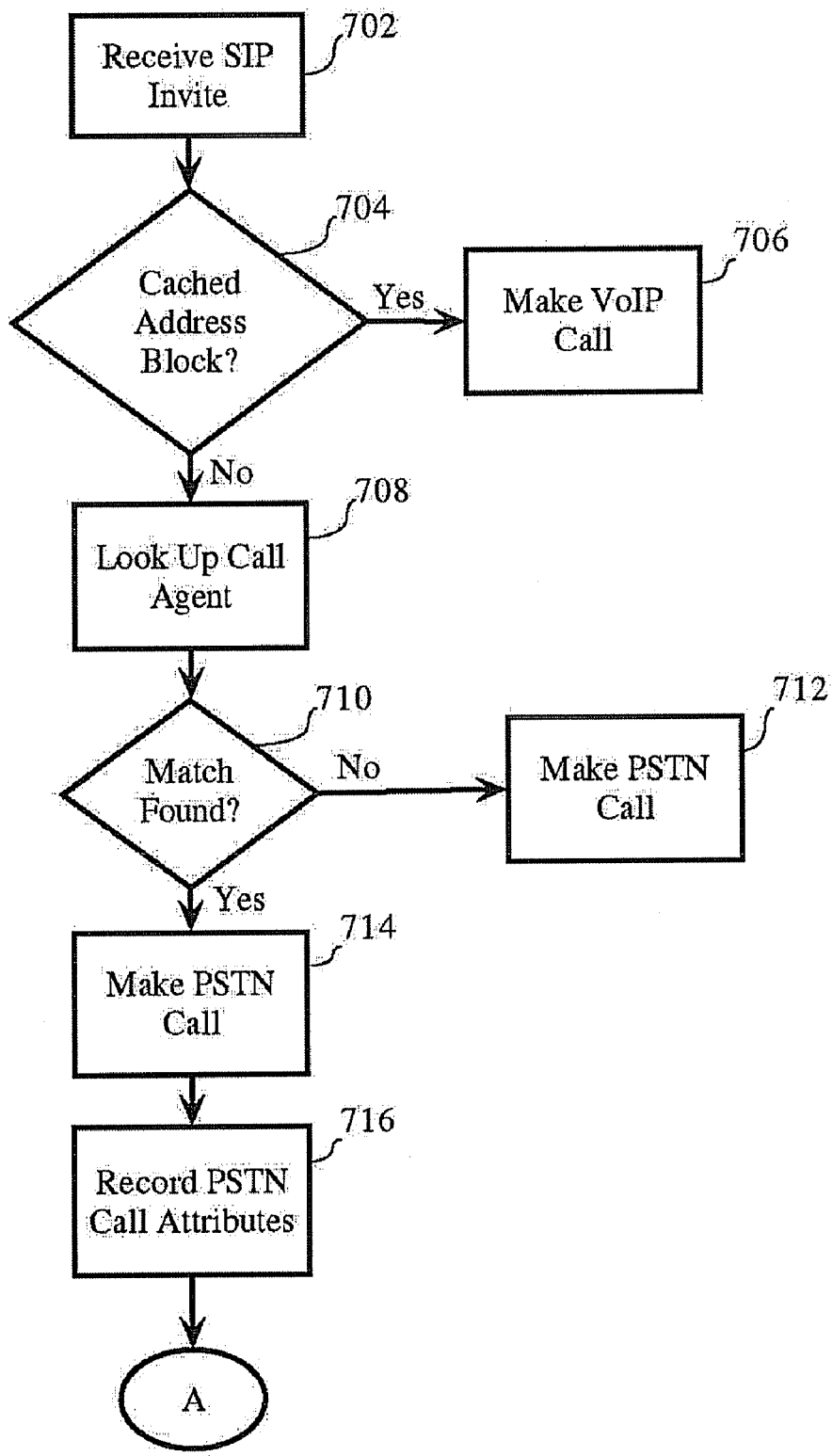
FIGS. 7A and 7B illustrate an example process flow implemented at an originating call agent and associated with verifying a destination call agent during a PSTN call.
Figure 7B:
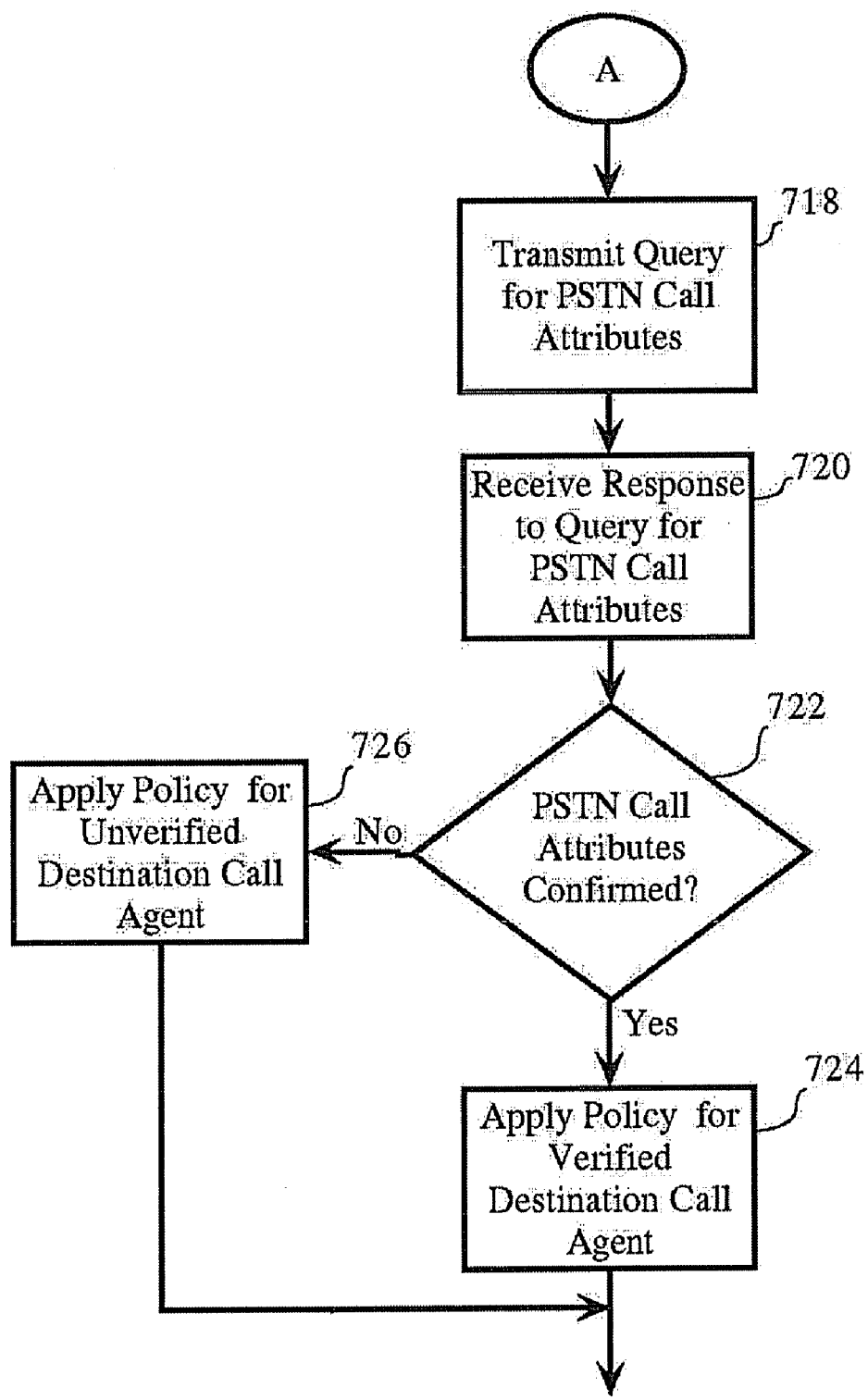

FIGS. 7A and 7B illustrate an example process flow implemented at the originating call agent directed to verifying the destination call agent during a PSTN call. As FIG. 7A shows, the process begins when the originating call agent receives a call initiation message such as a SIP invite from an originating client (702). In one embodiment, the call initiation message includes a destination telephone number.

The originating call agent accesses its cache to determine if there is a validated matching entry with an address block associated with the destination number (704). If so, the originating call agent makes a VoIP call (706).

If there is not a matching validated entry in the cache, the originating call agent looks up the destination call agent in the registry (708). If a match is not found (710), the originating call agent makes a PSTN call (712).

If a match is found (710), the originating call agent still makes a PSTN call (714) and also performs the following steps. The originating call agent records the PSTN call attributes in a data store (e.g. a called-out database) (716). As described above, in one implementation, the data store may be a temporary data store that stores the information for a period of time. In one implementation, the PSTN call attributes may include a PSTN call start time, a caller ID of the destination client, voice signature information (such as spectral analysis or silence/activity periods), DTMF, and any other information that the originating call agent may use to verify that the destination call agent is connected during the PSTN call.

Referring to FIG. 7B, while the PSTN call is still in progress, the originating call agent transmits a query for PSTN call attributes to the destination VoIP (718). In particular implementations, the query may request that the destination call agent provides similar information as the query described above in connection with step 602 of FIG. 6, except that the PSTN call attributes would not include a call stop time or a call length, as the PSTN call would still be in progress.

In one implementation, when the destination call agent receives a PSTN call, the destination call agent forwards the PSTN call to the destination client, and records the PSTN call attributes in a data store (e.g. a called-in database). Upon receiving the query for PSTN call attributes, the destination call agent sends a response. When the originating call agent receives the response to the query for PSTN call attributes (720), the originating call agent determines if the PSTN call attributes are confirmed (722). If the PSTN call attributes are confirmed, the originating call agent applies an appropriate policy for verified destination call agents (724). For example, the originating call agent may cache the VoIP call routing information, so future calls may go over VoIP. Or, the originating call agent may transfer the PSTN call in-progress to a VoIP call. If the PSTN call attributes are not confirmed, the originating Call agent applies an appropriate policy for unverified destination call agents (726). For example, the originating call agent may log the verification failure in the cache, generate an alert message, end the call, etc.

In one embodiment, if an attacker claims a telephone number that the attacker does not actually own, no call will ever be made to the attacker over VoIP, because the terminating call agent of the attacker would not be able to successfully respond to a query for PSTN call attributes, since the PSTN call would have gone to the actual owner of the telephone number.

In one embodiment, if an attacker claims ownership to a larger prefix than the attacker actually owns, the attacks may not be detected initially but would probably be detected. This is because some of the calls can be expected to be made over the PSTN, thereby assuring that the falsified numbers are eventually tried and detected. In one implementation, an enterprise may require that a PSTN call be made at least once to any particular destination telephone number. While this may cause more PSTN calls to be made, this would eliminate such attacks.

Because the registry is not used at the initial call setup time, any latency has no impact on call setup delays. Indeed, call setup times using implementations disclosed herein will be faster than even over the PSTN, because the originating call agent communicates directly with the destination call agent. In many cases, not even a Transmission Control Protocol (TCP) connection setup is required, because such a connection may have already been established and maintained as a consequence of a previous call to that terminating call agent.

However, in another implementation, when a PSTN call arrives at the terminating call agent, the terminating call agent holds the call and does not deliver the call yet to the terminating client. Rather, the terminating call agent examines the caller ID from the PSTN call setup message, and queries the registry for this number. If a match is found, the terminating call agent further holds the call in anticipation of receiving a request to verify the PSTN call attributes. Once this validation has succeeded, the originating call agent can place a VoIP call, and the terminating call agent can reject the PSTN call and proceed with the VoIP call. This eliminates the need for a PSTN call to actually be completed, but increases call setup delays as a consequence.

Furthermore, implementations disclosed herein are failsafe in that the originating call agent may make PSTN calls even when the destination call agent is verified against the cache or against the registry. In other words, even if a given originating call agent crashes and recovers, losing its cache, or if the registry is compromised in some way, or any of a number of problems occur, the worst case is that calls still get routed over the PSTN. As such, the end user experiences no disruption in service. Some P2P VoIP overlay network providers need to provide centralized servers that hand out user names within their network and hand out certificates. Because implementations described herein utilize telephone numbers that have already been issued to an enterprise, no such central services are required.

As described in more detail below, the cache maintained by the call agent and the registry may be used to verify caller ID information in received VoIP calls. For example, when a given destination call agent receives a call initiation message over a packet-based communications network (e.g., SIP invite) having an associated caller ID containing a phone number, the destination VoIP may verify the caller ID against the cache of the call agents and/or against the public registry. This provides two levels of validation.

Figure 8:
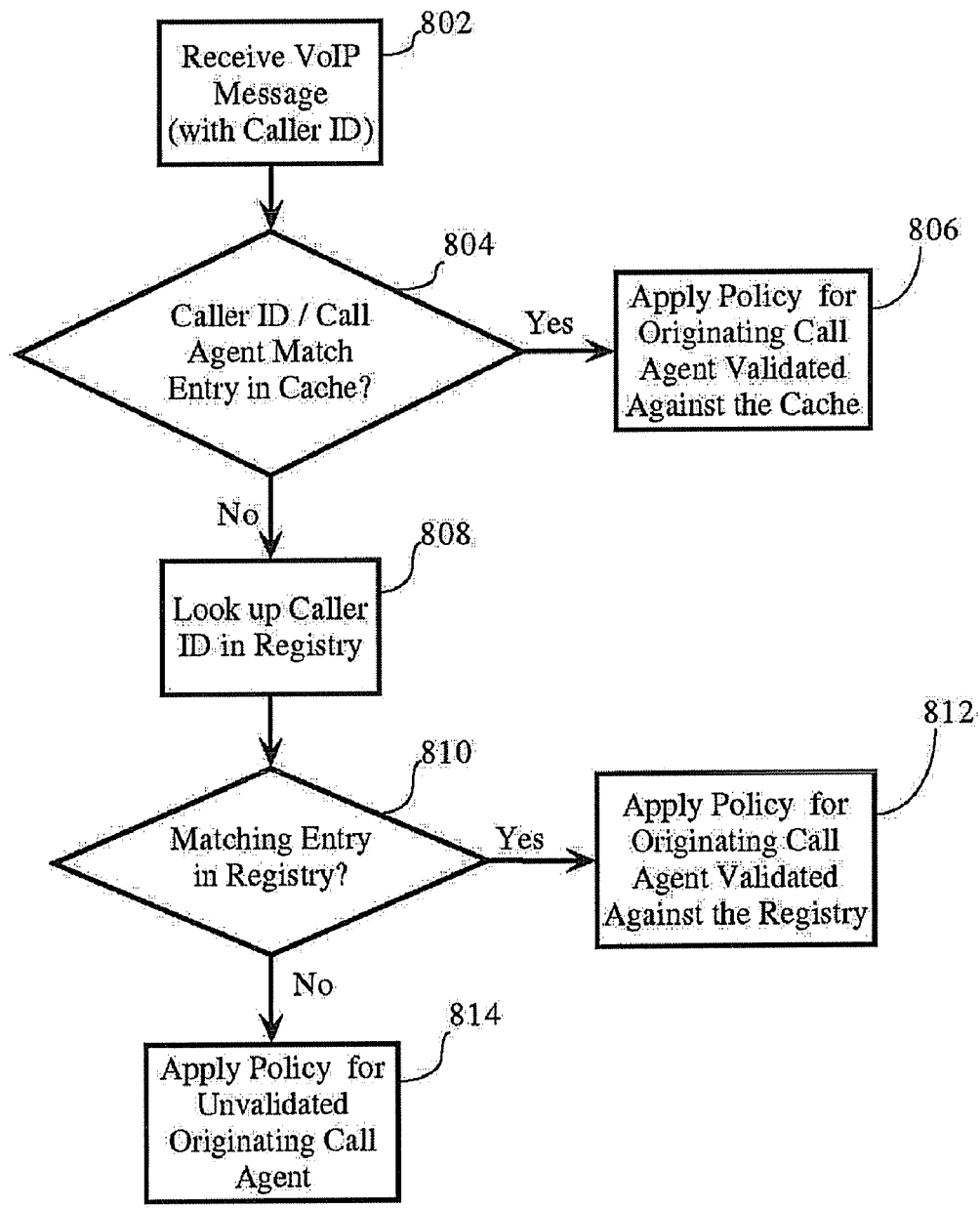
FIG. 8 is a flow chart of operation of one embodiment implemented at a destination call agent and associated with verifying the caller ID in a call initiation message.

FIG. 8 is a flow chart implemented at the destination call agent and associated with verifying the caller ID in a received call setup message. As FIG. 8 shows, the destination call agent receives a call initiation message such as a SIP invite from an originating call agent (802). In one implementation, the call initiation message contains a caller ID. The destination call agent searches its cache for a matching entry to determine if the caller ID matches a phone number in the cache, and whether that number has been verified. If that number has been verified, the call agent checks if the identity of the entity sending the call setup request matches the identity of the call agent that was verified (based on matching certificates used in TLS procedures, or based on matching IP addresses, or any other suitable means of comparison) (804). If so, the destination call agent applies one or more policies for originating call agents that are validated against the cache (806). For example, in one implementation, the destination call agent may indicate to the user of the destination client that the sender (originating call agent) is verified. In one implementation, the destination call agent may selectively show the caller ID, or add a symbol or character indicating a valid caller ID. In one implementation, the destination call agent may permit the call, etc.

If the caller ID has not been verified, but matches a number in the cache, or the caller ID does not match any number in the cache, the destination call agent may look for a matching entry in the registry (808, 810). If there is a matching entry in the registry or in the cache, and the identity of the call agent in the registry entry (which may have been cached) matches the identity of the agent that sent the call setup request (based on matching certificates used in TLS procedures, or based on matching IP addresses, or any other suitable means of comparison) the destination call agent applies one or more policies for originating call agents that are validated by the registry (812). Similar to the one or more policies that may be applied in step 806, in particular implementations, the destination call agent may indicate to the user of the destination client that the sender (originating call agent) is verified (and optionally indicate a second level of validation), may show the caller ID, may permit the call, etc. If the caller ID does not match a phone number in the registry, the destination call agent applies one or more policies for unvalidated originating call agents (814). For example, in one embodiment, the destination call agent may indicate to the user of the destination client that the sender is unverified, or may show no caller ID, or may deny the call, etc.

Because a malicious call agent may provide a false caller ID, this process enables a given call agent to provide caller ID information to two levels of verification. As described above, the VoIP may utilize the cache or the registry to verify the caller ID against previous verifications or against an IP address and port number, the former of which cannot be falsified. Accordingly, implementations described herein have an advantage of preventing caller ID spoofing. For example, if an originating call agent of an enterprise launches a SIP call with a fake caller ID, the fake caller ID may match an entry corresponding to a call agent of a different enterprise.

In one implementation, in addition to verifying the caller ID against the cache or against the registry, the destination call agent may also verify the originating call agent according to the verification processes described above in connection with FIGS. 4, 6, 7A, and 7B. As such, an originating call agent using a fake ID would not be able to successfully respond to a request for PSTN call attributes.

In one embodiment, the originating and destination call agents may verify each other based on the same call. For example, in one implementation, the originating call agent may make both a PSTN call and a VoIP call to the destination call agent. When receiving the PSTN call, if the destination call agent determines that the caller ID corresponds to another call agent in the network, the destination call agent holds the PSTN call for predefined time period (e.g., a few seconds). When the VoIP call arrives, mutual authentication is performed. In other words, the originating and destination call agents verify each other as described above. If mutual authentication succeeds, the PSTN call is rejected and the VoIP call proceeds.

This approach provides highly reliable validation of the advertised number blocks in the P2P network, as well as provides a VoIP anti-spam function. In one implementation, if an originating call agent is making too many VoIP calls, even though the originating call agent is validated, the terminating call agent can reject incoming VoIP calls from that call agent, and redirect the incoming VoIP calls to utilize the PSTN instead. This passes costs onto the originating call agent and therefore helps alleviate VoIP spam.

Also, because this technique uses telephone phone numbers, the technique may make it difficult for a spammer to change identifiers. Changing identifiers in email is inexpensive and easy, because domains and user IDs within a domain are practically free and in infinite supply. This is not so with telephone numbers, which are a more expensive and a finite resource. Furthermore, because telephone numbers are used, an enterprise that is spamming can be traced back through its service provider. Black lists also become much more effective, because of the finite namespaces of phone numbers.

In one implementation, the validation of VoIP routes may be separated from the call agent. A validation server—instead of the call agent—may validate ownership of a telephone number or otherwise communicate with the registry. The separation may result in: (1) elimination of use of the call agent to connect to the P2P network; (2) a decoupling of the call agent from the details of how VoIP routes are learned; (3) elimination of use of the validation server during the setup of outgoing calls; and (4) the validation server may learn VoIP routes for multiple call agents.

The elimination of the need for the call agent to connect to the P2P network may be desirable. Administrators may be reluctant in some cases to permit the call agent to be connected to the P2P network. Call agents may be considered by administrators to be critical infrastructure. Being connected to the P2P network may require the call agent to process background P2P traffic. Additionally, traffic sent and received on the P2P network may be encrypted. Unlike VoIP traffic, a firewall and/or a session border controller may not be able to monitor the encrypted P2P network traffic.

Rounding Values

As described above, the system 200 may validate a mapping of a phone number to an enterprise by using shared knowledge of one or more PSTN calls. This shared knowledge may include call attributes, such as the caller ID, call start time, call stop time, and the called number. To perform the validation, the system may convert the call attributes into a username and password. The system 200 may use login protocols that facilitate both sides independently determining whether the other side knows the password. A login protocol may be any now known or later discovered mechanism for authenticating based on a password or other shared secret. Use of a login protocol—as opposed to just transmitting the call information—may improve overall security if, for example, the password or other shared secret is not transmitted between the sides. These protocols, in general, rely on bit-exactness in the password. In typical usages of these protocols, the password is a password that may be precisely generated without a margin of error, so bit-exactness is not a problem.

However, in the PSTN validation described above, the password may be constructed from timestamps of the call start and end times. The timestamps generated at each end of the call may differ from each other. In one example, the timestamps may vary due to a delay in signaling on the PSTN. For example, party A hangs up, and the hang-up message is received by party B 100 ms later. In another example, the timestamps may differ due to potential clock skew and/or clock drift.

The system 200 may just round the timestamps down to the nearest value. For example, assume that the timestamps should be within d seconds of each other. Let $T_r$ be the rounding interval and d be the acceptable difference between the values. So, for example, $T_r=5$ s and $d=200$ ms, meaning times are rounded to multiple of 5 s and the timestamps should be within 200 milliseconds of each other before rounding. The problem is that both sides may round to different values even if the clocks at both sides are within 200 ms of each other. For example, if the calling side has the start time of 400.100 seconds, and the called side has the start time of 399.950 seconds, the start times are within 200 ms of each other, but the start times are rounded down to different values. This problem may happen using any rounding algorithm. The probability that both sides round to different values is $d/T_r$. To make this probability small, $T_r$ may be made large in comparison to d. However, if $T_r$ is very large compared d, the overall security may, in some examples, be reduced.

In one implementation, the terminating side of the exchange rounds each of the timestamp values down to the nearest multiple of the rounding interval. In this implementation, if there are two timestamps, each timestamp would be rounded down, producing two values on the terminating side. If three timestamps were used, each would be rounded down, producing three values on the terminating side. The terminating side may use these values to generate the security keys for the security protocols. In contrast, the originating side may make multiple attempts, and, on each attempt, use a different rounded value for at least one of the timestamps. For each timestamp, there are two possible rounded values to try. For example, where there are two timestamps, there are two possible rounded values to try for each one of the two timestamps, for a total of up to four attempts. Where there are three timestamps, and two possible rounded values to try for each, the originating side may make up to eight attempts.

For the start time and stop time, the originating node may round as described below. Let T be the start time or stop time as measured at the originating node. Let N be the positive integer value such that $N*T_r <= T < (N+1)*T_r$. In other words, $N*T_r$ is T rounded down to the nearest multiple of $T_r$, and $(N+1)*T_r$ is T rounded up to the nearest multiple of $T_r$. Let T1 and T2 be the two rounded values to try at the originating node. The following algorithm may be used to determine T1 and T2:

```
if (T >= ((2N+1)/2) * T_r) then:
    T1 = (N+1)*T_r
    T2 = N*T_r
if (T < ((2N+1)/2) * T_r) then:
    T1 = N*T_r
    T2 = (N-1)*T_r
```

In other words, if T is in the top half of the rounding interval, the originating side may try the rounded values above and below T. If T is in the bottom half, the originating side may try the rounded values below T, and below T again.

Figure 9:
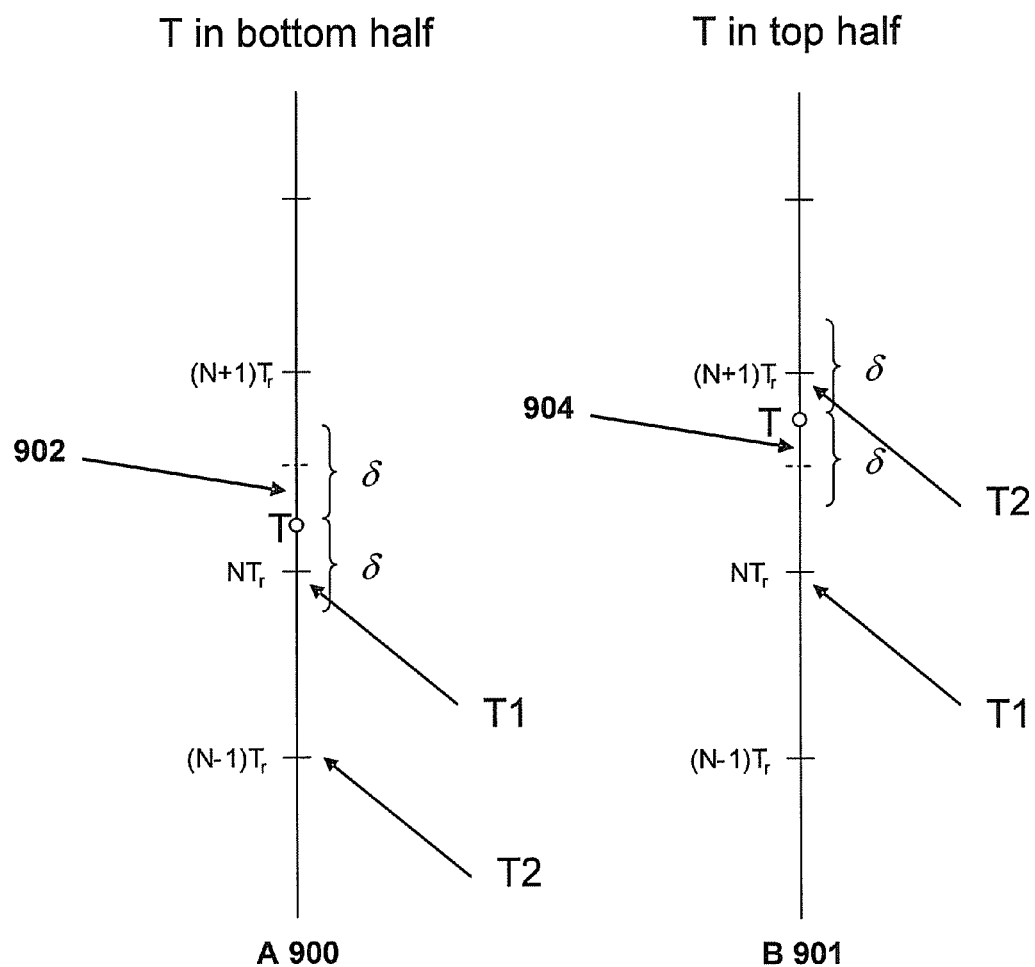
FIG. 9 illustrates two number lines, where T is in the bottom half of the rounding interval on one number line and in the top half of the rounding interval on a second number line.

To further clarify, FIG. 9 illustrates two number lines, individually designed A 900 and B 901, where T is in the bottom half 902 of the rounding interval on number line A 900 and T is in the top half 904 of the rounding interval on number line B 901. In FIG. 9, T is the value at the originating side. Since the value at the terminating side should be within delta, δ, of the value at the originating side, the value at the terminating side has to be within the range of the curly brackets around T. When T is in the bottom half 902 of the interval, the value at the terminating side may have been a value below $N*T_r$, in which case the terminating side would have rounded down to $(N-1)T_r$. Or, the value at the terminating side may have been a value above T, in which case the terminating side would have rounded down to $N*T_r$. But, as long as delta is less than $T_r/2$, when T is within the bottom half 902 of the range, the value at the terminating side cannot have been large enough that the terminating side would have rounded down to (N+1)T, nor could the value at the terminating side have been small enough that the terminating side would have rounded down lower than $(N-1)*T_r$. Pictorially, as one slides the value of T starting at $N*T_r$, upwards towards the middle of the rounding range, a value at the terminating side within the scope of the curly brackets would have rounded down to either $N*T_r$ or $(N-1)*T_r$. When T is in the lower half of the rounding interval, the nearest multiple of $T_r$ is $N*T_r$. Therefore, T1 and T2 may be the nearest multiple of $T_r$ and the nearest multiple of $T_r$ minus $T_r$, respectively.

Once T passes the middle of the rounding range into the top half 904 of the rounding range, the set of rounded values, T1 and T2, changes. Now, the terminating side may have rounded down to $N*T_r$ or down to $(N+1)*T_r$. Again, pictorially, as one slides the value of T up the number line in the top half of the rounding range, a value at the terminating side within the scope of the curly brackets would have rounded down to either $N*T_r$ or $(N+1)*T_r$. When T is in the upper half of the rounding interval, the nearest multiple of $T_r$ is $(N+1)*T_r$. Therefore, T1 and T2 may be the nearest multiple of $T_r$ and the nearest multiple of $T_r$ minus $T_r$, respectively, regardless of where in the rounding range T lies.

Accordingly, one implementation insures that, with no more than two attempts for one timestamp (and no more than four attempts for two timestamps), one of the attempts is guaranteed to match the values rounded to at the terminating side, if the value on the originating side is within delta or the value on the terminating side.

For example, the originating side may try the different possible values for each of the start time and end time in the following combinations:
Try $Tstart_1$ and $Tend_1$
Try $Tstart_2$ and $Tend_1$
Try $Tstart_1$ and $Tend_2$
Try $Tstart_2$ and $Tend_2$ The terminating side may handle each of the validation attempts as a separate and independent login/validation attempt. In one example, the terminating side may not keep state or track progress from one attempt to the next. The originating side may make the multiple attempts, because the originating side is seeking to learn the route to the terminating side. Thus, the originating side may be more burdened with the extra work than the terminating side. Alternatively or in addition, the terminating side may make multiple attempts at validating instead of the originating side, thus burdening the terminating side more than the originating side.

Consider a particular example. The terminating side may have the start and stop times as {399.950, 503.520}. If $T_r$=200 ms, the terminating side may round down the start and stop times to {399.800, 503.400}. The originating side may have the start and stop times as {400.100, 503.500}. The originating side may attempt four logins with a different permutation of rounded values on each attempt:
attempt 1: {400.000, 503.400}
attempt 2: {400.000, 503.200}
attempt 3: {399.800, 503.400}
attempt 4: {399.800, 503.200}

Attempts 1 and 2 will fail. In attempt 3, the times will match the times the terminating side has rounded to, and, thus, will succeed. Attempt 4 may be skipped after attempt 3 is determined to succeed.

Alternatively or in addition, three possible values, $N*T_r$, $(N+1)*T_r$, and $(N-1)*T_r$, may be tried for each one of the timestamps without regard to whether T is in the bottom half 902 or the top half 904 of the rounding interval. Alternatively or in addition, the rounding directions could opposite to that described above. For example, the terminating side may always round up instead of always rounding down. If T at the originating side is in the bottom half 902 of the rounding interval, then T1 and T2 may be $N*T_r$ and $(N+1)*T_r$, respectively. Similarly, if T at the originating side is in the top half 904 of the rounding interval, then T1 and T2 may be $(N+1)*T_r$ and $(N+2)*T_r$, respectively. Therefore, T1 and T2 may be the nearest multiple of $T_r$ and the nearest multiple of $T_r$ plus $T_r$, respectively.

Each attempt may involve asymmetric key computations and may be computationally expensive. If additional values are to be jointly compared, such as three timestamps instead of two, then the number of potential attempts may increase exponentially.

In a second implementation, the terminating side may generate a bit exact vector knowing the direction in which the originating side rounded, where the bit exact vector matches a bit exact vector generated at the originating side. For any vector V comprising N values, $V_1 \ldots V_N$, that is to be compared against a vector Y comprising N values, $Y_1 \ldots Y_N$, a system may compute bit exact vectors, VB and YB, where VB includes rounded values of V, and YB includes rounded values of Y, such that VB=YB as long as $ABS(V_i-Y_i)$<delta for i=1 ... N, where ABS( ) is the absolute value function.

A vector may be an array of numbers or any other structure that includes the numbers. The vector may include just one number. Alternatively, the vector may include more than one number. Each number included in the vector may be referred to as an element of the vector.

The comparison in the PSTN validation may be interactive because information—for example, the username—may be sent from one side to the other. Thus, additional information may be sent between the sides that facilitates arriving at a bit exact value for the password without incurring a material loss of entropy. For example, the additional information may include an indication of the rounding direction of the first value, $V_i$, which was rounded to the first rounded value, $VB_i$.

Let A be the 'caller'—the side with vector V. Let B be the callee—the side with vector Y. If delta is the acceptable error range, A may round each element of the V vector to the nearest rounding interval, $T_r$=4*delta, to generate VB. In a different example, a value of $T_r$ greater than 4*delta, such as 5*delta, may be used as the rounding interval. In other words, delta may be less than or equal to $T_r/4$. While rounding, A may populate a rounding vector, R, with N values, each of which may be zero or one. If A rounds $V_i$ up, then A may set $R_i$ to 1. If A rounds $V_i$ down, then A may set $R_i$ to zero. Alternatively, different values may be used to indicate the rounding direction. Once A rounds $V_i$ to obtain $VB_i$, for i=1 to N, then the rounding vector R may be sent as part of the login. For example, the rounding vector may be an additional field in the username. Alternatively or in addition, the rounding vector may be exchanged in any part of a logon protocol. In a different example, a collection of indicators other than a collection of values may be used instead of the rounding vector. For example, the indicators may be string variables, where "A" indicates rounding up, and "B" indicates rounding down.

Figure 10:
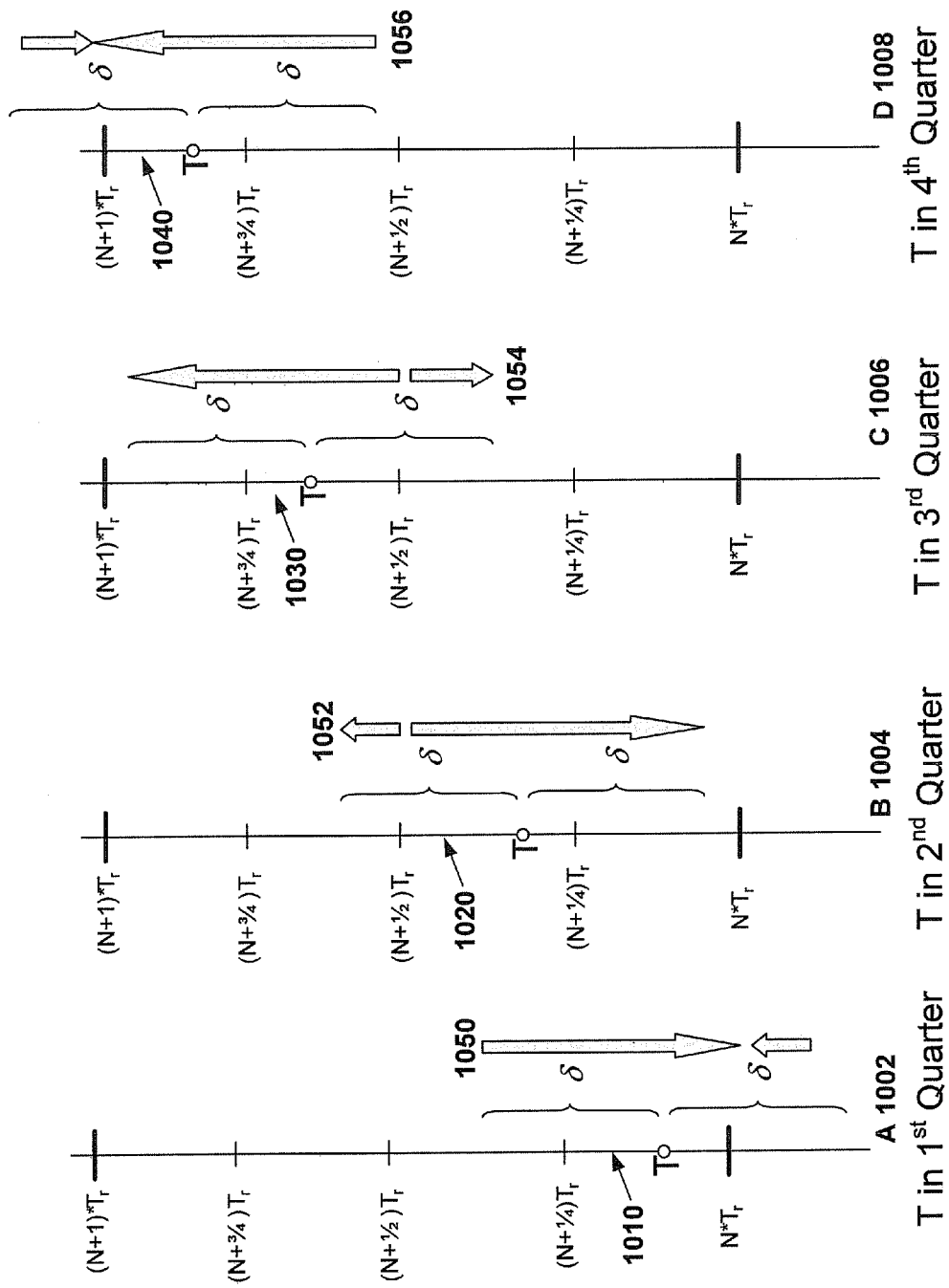
FIG. 10 illustrates how to generate each value, T, in the bit exact vector knowing the direction in which the originating side rounded the corresponding value.

B may use the rounding vector, $R_i$, that includes an indication of which direction the first value, $V_i$, was rounded to obtain the first rounded value, $VB_i$, in order to generate the second rounded value, $YB_i$, from the second value, $Y_i$. When B receives the rounding vector, R, B may follow the algorithm described below when rounding $Y_i$ to obtain $YB_i$. Let FLOOR=int($Y_i/T_r$)*($T_r$), which is the largest multiple of $T_r$ that is less than $Y_i$. Stated differently, FOOR is $Y_i$ rounded down to the nearest multiple of $T_r$. The value FLOOR+$T_r$ is $Y_i$ rounded up to the nearest multiple of $T_r$. In other words, FLOOR=$N*T_r$, where N is a positive integer value such that $N*T_r$<=$Y_i$<$(N+1)*T_r$. To determine whether B should round $Y_i$ up or down, B may use the following algorithm:

--- if $(3/4)*(T_r)$ < $Y_i$ – FLOOR < $T_r$ then ROUND UP
if $(1/2)*(T_r)$ < $Y_i$ – FLOOR < $(3/4)*(T_r)$ then
   if Ri=1 ROUND UP else ROUND DOWN
if $(1/4)*(T_r)$ < $Y_i$ – FLOOR < $(1/2)*(T_r)$ then
   if Ri=1 ROUND UP else ROUND DOWN
if $Y_i$ – FLOOR < $(1/4)*(T_r)$ then ROUND DOWN The second implementation may also be understood pictorially. FIG. 10 illustrates how to generate each value in the bit exact vector at the terminating side knowing the direction in which the originating side rounded a corresponding value. FIG. 10 includes four number lines individually designated A 1002, B 1004, C 1006, and D 1008. On each one of the number lines, 1002, 1004, 1006, and 1008, T is the value, $Y_i$, at the terminating side. On each one of the number lines, 1002, 1004, 1006, and 1008, T lies in a different quarter, 1010, 1020, 1030, and 1040, of the rounding interval. The curly brackets indicate the range of acceptable values, $V_i$, at the originating side when T is the value at the terminating side. Arrows, 1050, 1052, 1054, and 156, adjacent to the range of acceptable values for the originating side, illustrate the direction the originating side would have rounded.

Consider the four different quarters, 1010, 1020, 1030, and 1040, of the rounding interval in which T may be. When T is in the lowermost quarter 1010 of the rounding range, the value, $V_i$, at the originating side is always such that $V_i$ would have been rounded up to $N*T_r$, or rounded down to $N*T_r$. Because delta is less than $T_r/4$, or the difference between T and $V_i$ is less than $T_r/4$, the value, $V_i$, at the originating side should not have been greater than $(N+\frac{1}{2})*T_r$. Thus, the originating side should not have rounded up to $(N+1)T_r$ if $V_i$ was within the acceptable range of T. Furthermore, the value, $V_i$, at the originating side should not have been lower than $(N-\frac{1}{2})*T_r$. Thus, the originating side should not have rounded $V_i$ down to $(N-1)*T_r$. Accordingly, as long as T is within the bottom quarter 1010 of the rounding interval, the terminating side may safely round T down to $N*T_r$ to obtain $YB_i$, because the originating side would have rounded $V_i$ to $N*T_r$ if $V_i$ was within the acceptable range of T.

When T is in the lower middle quarter 1020 of the rounding range, the originating side may have rounded $V_i$ up to $(N+1)*T_r$, or may have rounded $V_i$ down to $N*T_r$, but only to one of those two values. Consequently, if the terminating side simply rounds T in the same rounding direction in which the originating side rounded, the terminating side will also round T to the same value that the originating side rounded $V_i$ to. The same happens for the upper middle quarter 1030 of the rounding interval.

Finally, if the terminating side has a value of T in the upper quarter 1040 of the rounding interval, the originating side will have rounded to $(N+1)*T_r$ if the value at the originating side was within the acceptable range of T. Thus, the terminating side should round up to $(N+1)*T_r$ when T is in the upper range 1040 of the rounding interval in order to obtain the same value that the originating side rounded to. The bottom quarter 1010, the lower middle quarter 1020, the upper middle quarter 1030, and the upper quarter 1040, may be referred to as the first quarter, the second quarter, the third quarter, and the fourth quarter, respectively, of the rounding interval.

The resulting rounded vector YB will match the rounded vector VB that the originating side generated if $|Y_i-V_i|$ is less than or equal to delta. In other words, when the terminating side rounds $Y_i$ and $Y_i$ is in the second or third quarter, 1020 and 1030, of the rounding interval, the terminating side rounds in the same direction that the terminating side did. When the terminating side rounds $Y_i$ and $Y_i$ is at the bottom quarter 1010 of the rounding interval, the terminating side rounds down. When the terminating side rounds $Y_i$ and $Y_r$ is in the top quarter of the rounding interval 1040, then the terminating side rounds up. In other examples, different regions of the rounding interval other than $\frac{1}{4}$, $\frac{1}{2}$, and $\frac{3}{4}$, may be used. Making the rounding interval at least 4*delta, provides sufficient information for the two sides to generate VB and YB that match if $|Y_i-V_i|$ is less than or equal to delta.

Although the example described above describes the terminating side generate a bit exact vector knowing the direction in which the originating side rounded, the same algorithm may be used for the originating side to generate a bit exact vector knowing the direction in which the terminating side rounded.

Little entropy is lost since a single bit for each rounded value is sent. In the first algorithm above (which uses multiple attempts), by trying twice for each value—the round up and round down versions—this bit is effectively given up anyway. Thus, the second implementation has effectively identical entropy to the first implementation described above, but at ¼th the computational cost and ¼th the latency, when the security key is based on two values.

Consequently, one example uses multiple passes of validation, one for each rounding value, with the burden of performing the validation on the one side or the other. A second example uses an interactive rounding algorithm which may include a rounding vector in, for example, the username, avoiding the need to make multiple attempts. One advantage over basic rounding is that a much, much smaller value for the rounding interval may be used and thus improve the overall security of the system.

Figure 11:
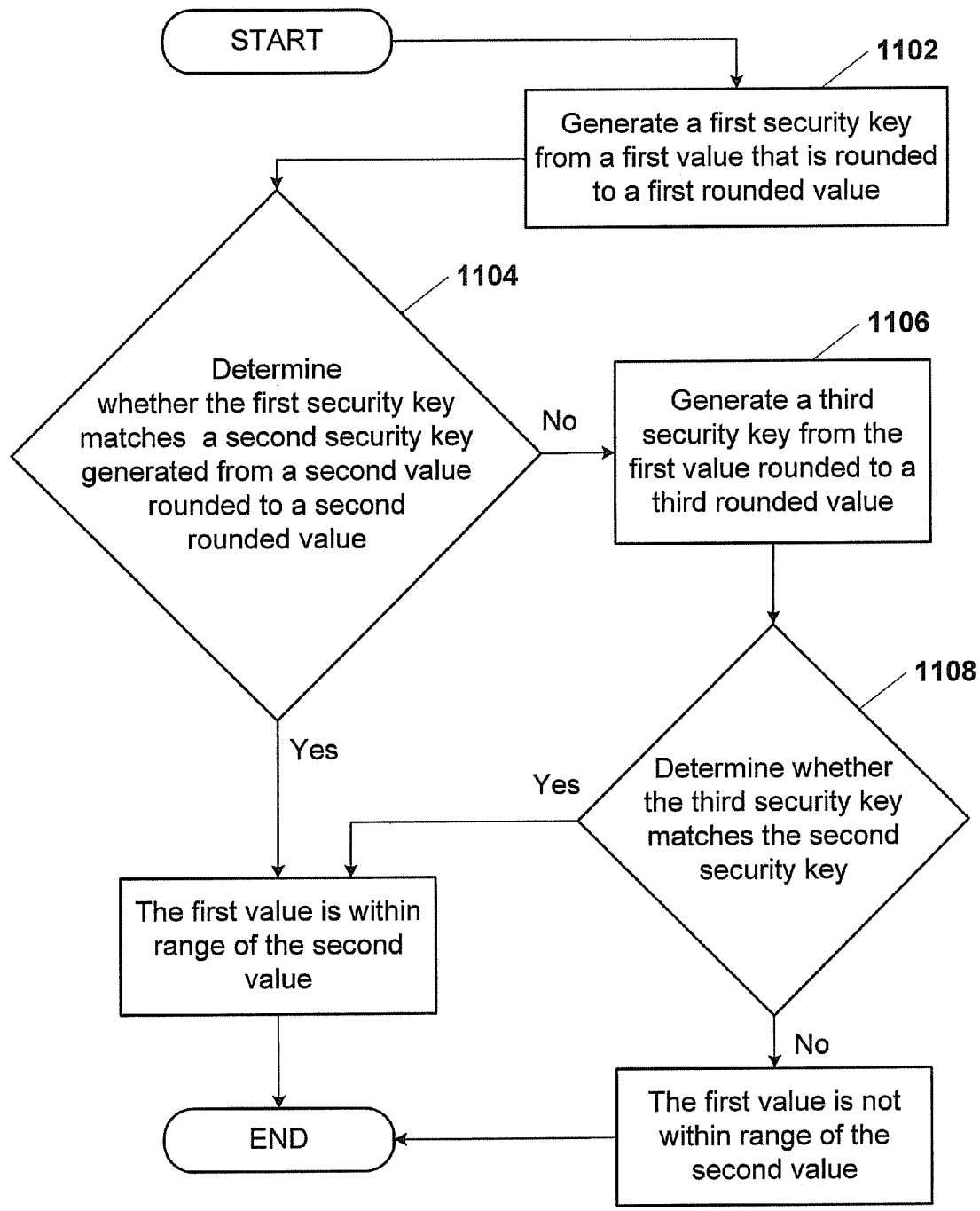
FIG. 11 illustrates a first example flow diagram of the operation of a system to generate a first security key that match matches a second security key, where the security keys are generated from rounded values and where the values that are rounded are within an acceptable range of each other.

FIG. 11 illustrates a first example flow diagram of the operation of the system to generate a first security key that match matches a second security key, where the security keys were generated from rounded values and where the values that are rounded are within an acceptable range of each other. The operation may include fewer, different, or more blocks. For example, the operation may include generating a fourth security key from the first value rounded to a fourth rounded value.

The operation may begin at block 1102 by generating the first security key from a first value that is rounded to a first rounded value. For example, the operation may include generating the first security key by rounding the first value to a nearest multiple of the rounding interval in response to determining that the first value is in the bottom half of the rounding interval.

The operation may continue at block 1104 by determining whether the first security key matches a second security key that was generated from a second value rounded to a second rounded value. If the first security key matches the second security key, then the first value is within range of the second value.

Alternatively, if the first security key fails to match the second security key, then the operation may continue to block 1106 by generating a third security key from the first value rounded to a third rounded value. For example, the operation may include rounding the first value to the third rounded value by calculating the third rounded value as the sum of the first rounded value and the rounding interval.

After generating the third security key, the operation may continue to block 1108 by determining whether the third security key matches the second security key. If the third security key matches the second security key, then the first value is within range of the second value. In one example, if the third security key fails to match the second security key, then the first value is not within range of the second value. In a second example, the operation may generate a fourth security key from the first value rounded to a fourth value and determining that the fourth security key fails to match the second security key before determining the first value is not within range of the second value. For example, the first security key, the third security key, and the fourth security may be generated from $N*T_r$, $(N+1)*T_r$, and $(N-1)*T_r$, respectively, where the first value is T.

The operation may end, for example, by authenticating a holder of the second security key to a holder of any one of the first, third, or forth security keys that matched the second security key. Alternatively, the operation may end, for example, by not authenticating the holder of the second security key because no generated security key matched the second security key.

Figure 12:
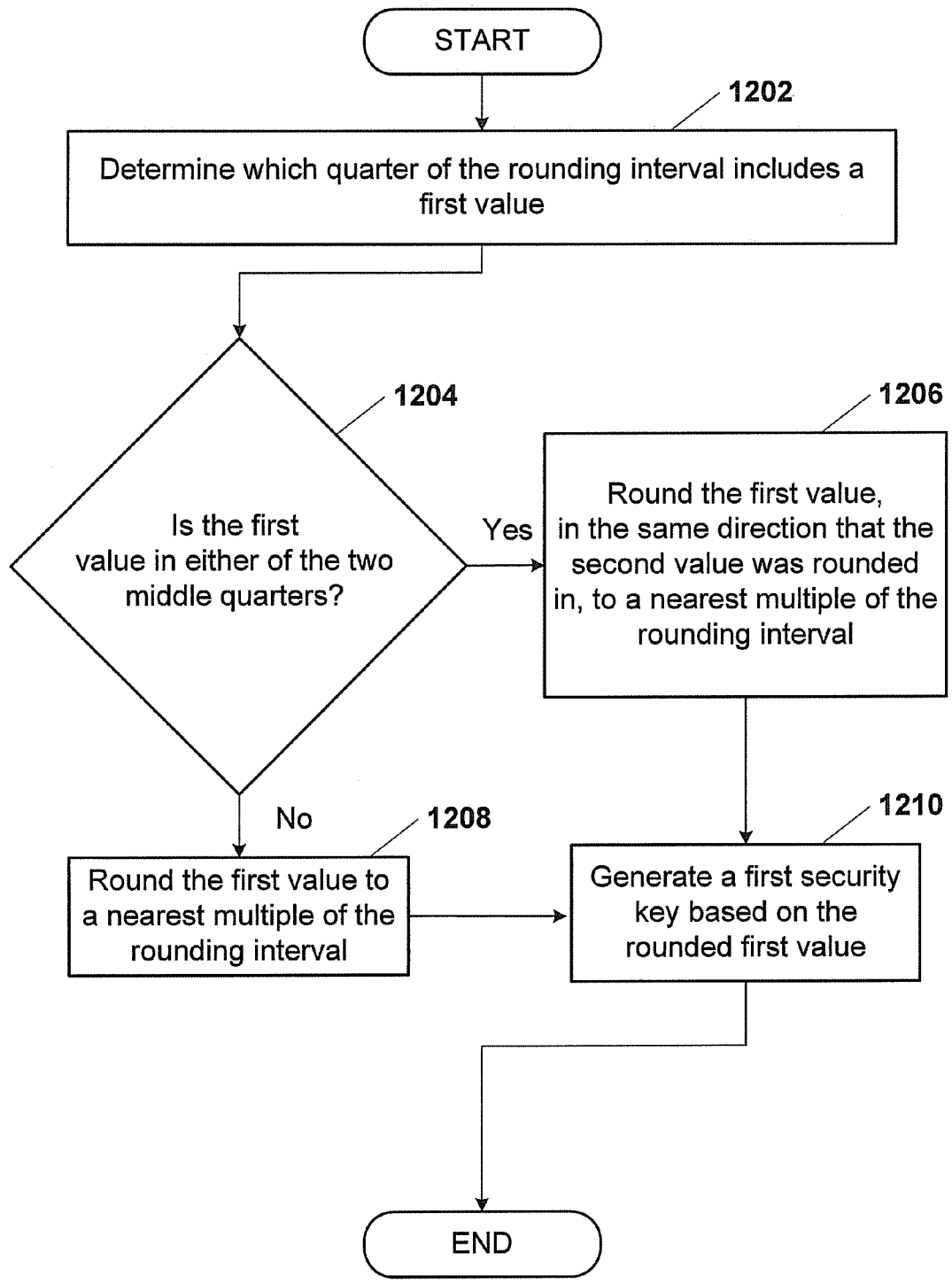
FIG. 12 illustrates a second example flow diagram of the operation of a system to generate a first security key that match matches a second security key, where the security keys were generated from rounded values and where the values that are rounded are within an acceptable range of each other.

FIG. 12 illustrates a second example flow diagram of the operation of the system to generate a first security key that match matches a second security key, where the security keys were generated from rounded values and where the values that are rounded are within an acceptable range of each other. The operation may include fewer, different, or more blocks.

The operation may begin at block 1202 by determining which quarter of the rounding interval includes the first value. The operation may continue at block 1204 by determining whether the first value is in either of the second quarter 1020 or third quarter 1030 of the rounding interval.

If the first value is in either of the second quarter 1020 or third quarter 1030 of the rounding interval, then the operation may continue at block 1206 by rounding the first value to the nearest multiple of the rounding interval that is nearest to the first value in the direction that the second value was rounded. The direction in which the second value was rounded may be determined, for example, from the rounding vector, R.

Alternatively, if the first value is not in either of the second quarter 1020 or third quarter 1030 of the rounding interval, then the operation may continue at block 1208 by rounding the first value to the nearest multiple of the rounding interval without regard to the direction that the second value was rounded.

From block 1206 and 1208, the operation may continue at block 1210 by generating the first security key from the rounded value determined from the first value. The operation may end, for example, by validating the identity of the call agent in response to the first security key matching the second security key.

In general, a system for generating security keys that match may include a processor and a memory. The system may include different, additional, or fewer components. For example the system may include additional processors and memories.

The memory may be any now known, or later discovered, data storage device. The memory may be a non-volatile and/or volatile memory, such as a random access memory (RAM), a read-only memory (ROM), an erasable programmable read-only memory (EPROM), or flash memory. The memory may include an optical, magnetic (hard-drive) or any other form of data storage device.

The processor may be in communication with the memory. The processor may also be in communication with additional components, such as a network. The processor may be a general processor, central processing unit, server, application specific integrated circuit (ASIC), digital signal processor, field programmable gate array (FPGA), digital circuit, analog circuit, or combinations thereof. The processor may be one or more devices operable to execute computer executable instructions or computer code embodied in the memory. The computer code may be executable to generate the security key. Alternatively or in addition, the computer code may be executable to determine whether one security key matches another security key.

The system facilitates forming shared secrets from values obtained from an analog or digital signal, where the shared secrets are for identity purposes. An example implementation may include any system that derives a shared secret from something in the real world. Examples of such systems include fingerprint scanning, speech recognition systems, retina scanning, or any other biometric based system. When the rounding vector is included, the algorithm may be particularly useful in systems using a large number of analog values.

The embodiments described above are illustrative examples, so other embodiments are possible. For instance, while embodiments have been described as operating in connection with P2P networks and PSTN networks, other embodiments may be used in connection with any suitable network environment.

Different components provide different functions for implementing the functionality of the various embodiments. The respective logic, software or instructions for implementing the processes, methods and/or techniques discussed above are provided on computer-readable storage media or memories or other tangible media, such as a cache, buffer, RAM, removable media, hard drive, other computer readable storage media, or any other tangible media or any combination thereof. The tangible media include various types of volatile and nonvolatile storage media. The functions, acts or tasks illustrated in the figures or described herein are executed in response to one or more sets of logic or instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system. Logic encoded in one or more tangible media for execution is defined as instructions that are executable by the processor and that are provided on the computer-readable storage media, memories, or a combination thereof. Any of the devices, features, methods, and/or techniques described may be mixed and matched to create different systems and methodologies.

What is claimed is:

1. Logic encoded in one or more non-transitory tangible media for execution with a processor and when executed, is operable to:
   generate, from a first value, based on rounding information, a first security key that matches a second security key whenever the first value and a second value from which the second security key is generated differ by less than a non-zero predetermined amount;
   wherein the second security key is generated from the second value rounded to a multiple of a rounding interval nearest to the second value; and
   wherein the rounding information includes a rounding direction indication, the rounding direction indication indicative of a direction in which the second value is rounded to the multiple of the rounding interval nearest to the second value, wherein the logic operable to generate the first security key is further operable to:
   when the first value minus a floor value is less than one-fourth of the rounding interval or greater than three-fourths of the rounding interval, round the first value to a multiple of the rounding interval nearest to the first value, the floor value being a multiple of the rounding interval nearest to and less than or equal to the first value; and when the first value minus the floor value is between one-fourth of the rounding interval and three-fourths of the rounding interval, round the first value to a multiple of the rounding interval nearest to the first value in the direction determined from the rounding direction indication.

2. The one or more non-transitory tangible media of claim 1, wherein the logic operable to generate the first security key is further operable to:

round a plurality of first values to a plurality of first rounded values based on the rounding information, the plurality of first values including the first value; and generate the first security key from the plurality of first rounded values, wherein the first security key matches the second security key when each one of the plurality of first values and a respective one of a plurality of second values differ by less than the non-zero predetermined amount, the second values include the second value, the second security key is generated from a plurality of second rounded values, each respective one of the second rounded values being a respective one of the second values rounded to a multiple of the rounding interval nearest to the respective one of the second values, and the rounding information includes an indication of which direction each respective one of the second values is rounded.

3. The one or more non-transitory tangible media of claim 2, wherein the logic operable to round the first values to the first rounded values based on the rounding information is operable to:

round each one of the first values to a multiple of the rounding interval nearest to the respective one of the first values whenever the respective one of the first values is closer than one-quarter of the rounding interval to the multiple of the rounding interval nearest to the respective one of the first values; and round each one of the first values in a direction determined from the indication of which direction the respective one of the second values is rounded whenever the respective one of the first values is farther than one-quarter of the rounding interval from the multiple of the rounding interval nearest to the respective one of the first values.

4. The one or more non-transitory tangible media of claim 1, wherein the logic, when executed with the processor, is further operable to determine whether the first security key matches the second security key, wherein the logic operable to determine whether the first security key matches the second security key is operable to:

receive the rounding information; and exchange authentication information indicative of whether the first security key and the second security key match.

5. The one or more non-transitory tangible media of claim 1, wherein the first value and the second value are start times of a Public Switched Telephone Network (PSTN) call.

6. A method comprising:

generating by a processor, from a first value, based on rounding information, a first security key that matches a second security key, the second security key generated from a second value rounded to a multiple of a rounding interval nearest to the second value, wherein the rounding information includes a rounding direction indication indicative of a direction in which the second value is rounded to the multiple of the rounding interval nearest to the second value, and wherein generating the first security key that matches the second security key includes:

rounding the first value to a rounded value based on the rounding direction indication, wherein rounding the first value to the rounded value based on the rounding direction indication includes:

rounding the first value to a multiple of the rounding interval nearest to the first value when the first value is less than one-quarter of the rounding interval away from the multiple of the rounding interval that is nearest to the first value; and rounding the first value in the direction indicated in the rounding direction indication when the first value is farther than one-quarter of the rounding interval away from the multiple of the rounding interval that is nearest to the first value; and generating the first security key from the rounded value by the processor.

7. The method of claim 6, wherein generating the first security key further comprises:

rounding a plurality of first values to a plurality of first rounded values based on the rounding information, wherein the first values include the first value, the first rounded values include the rounded value, and rounding the first values to the first rounded values based on the rounding information includes rounding the first value to the rounded value based on the rounding direction indication; and generate the first security key from the first rounded values, wherein the first security key matches the second security key when each one of first values and a respective one of a plurality of second values differ by less than a non-zero predetermined amount, the second values include the second value, the second security key is generated from a plurality of second rounded values, each respective one of the second rounded values being a respective one of the second values rounded to a multiple of the rounding interval nearest to the respective one of the second values, and the rounding information includes an indication of which direction each respective one of the second values is rounded.

8. The method of claim 7, wherein rounding the first values to the first rounded values based on the rounding information comprises:

rounding each one of the first values to a multiple of the rounding interval nearest to the respective one of the first values whenever the respective one of the first values is closer than one-quarter of the rounding interval to the multiple of the rounding interval nearest to the respective one of the first values; and rounding each one of the first values in a direction determined from the indication of which direction the respective one of the second values is rounded whenever the respective one of the first values is farther than one-quarter of the rounding interval from the multiple of the rounding interval nearest to the respective one of the first values.

9. The method of claim 6, wherein the first value and the second value represent an attribute of at least one PSTN call recorded at two respective nodes.

10. The method of claim 6, further comprising determining whether the first security key matches the second security key by:

receiving the rounding information; and exchanging authentication information indicative of whether the first security key matches the second security key.

11. The method of claim 10, wherein exchanging the authentication information includes exchanging the authentication information based on an Encrypted Key Exchange (EKE) protocol.

12. A system comprising:

a memory; and a processor in communication with the memory, the memory including computer code executable with the processor, wherein the computer code is configured to:

generate a first security key from a first value based on rounding information such that the first security key matches a second security key generated from a second value whenever the first value and the second value differ by less than a non-zero predetermined amount;

wherein the second security key is generated from the second value rounded to a multiple of a rounding interval nearest to the second value, and wherein the rounding information indicates a direction in which the second value is rounded; and wherein the computer code configured to generate the first security key from the first value is configured to:

round the first value to a multiple of the rounding interval nearest to the first value when the first value minus a floor value is less than one-fourth of the rounding interval or greater than three-fourths of the rounding interval, wherein the floor value is a multiple of the rounding interval that is nearest to and less than the first value; and round the first value to a multiple of the rounding interval nearest to the first value in the direction indicated by the rounding information when the first value minus the floor value is between one-fourth of the rounding interval and three-fourths of the rounding interval.

13. The system of claim 12, wherein the computer code is further configured to perform an authentication based on the first security key and the second security key being a password in the authentication.

* * * * *